United States Patent
Saha et al.

(10) Patent No.: US 12,455,915 B2
(45) Date of Patent: Oct. 28, 2025

(54) DISTRIBUTED ENTITY RE-RESOLUTION BASED ON STREAMING UPDATES

(71) Applicant: International Business Machines Corporation, Armonk, NY (US)

(72) Inventors: Avirup Saha, Kolkata (IN); Balaji Ganesan, Bengaluru (IN); Soma Shekar Naganna, Bangalore (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 17/880,814

(22) Filed: Aug. 4, 2022

(65) Prior Publication Data

US 2024/0045896 A1    Feb. 8, 2024

(51) Int. Cl.
G06F 16/355 (2025.01)
G06F 40/279 (2020.01)
G06N 3/042 (2023.01)
G06N 5/022 (2023.01)
G06N 20/00 (2019.01)

(52) U.S. Cl.
CPC .......... *G06F 16/355* (2019.01); *G06F 40/279* (2020.01); *G06N 3/042* (2023.01); *G06N 5/022* (2013.01); *G06N 20/00* (2019.01)

(58) Field of Classification Search
CPC ..... G06F 16/355; G06F 40/279; G06N 3/042; G06N 5/022; G06N 20/00
USPC .......................................................... 704/9
See application file for complete search history.

(56) References Cited

U.S. PATENT DOCUMENTS

| | | | | |
|---|---|---|---|---|
| 9,535,902 | B1* | 1/2017 | Michalak | G06F 16/3331 |
| 9,836,183 | B1* | 12/2017 | Love | G06F 16/904 |
| 10,380,486 | B2* | 8/2019 | Krauss | G06N 5/022 |
| 2017/0098163 | A1* | 4/2017 | Chandrasekaran | G06N 5/04 |
| 2021/0303638 | A1* | 9/2021 | Zhong | G06F 40/169 |

(Continued)

FOREIGN PATENT DOCUMENTS

CN    110647902 A  *  1/2020 ......... G06F 16/9024

OTHER PUBLICATIONS

"A System and Method for Verification of Predicted Links by Data Stewards", IP.com, IPCOM000269526D, Apr. 25, 2022, 5 pages.

(Continued)

*Primary Examiner* — Edwin S Leland, III
(74) *Attorney, Agent, or Firm* — Harrity & Harrity, LLP

(57) ABSTRACT

Mechanisms are provided for dynamic re-resolution of entities in a knowledge graph (KG) based on streaming updates. The KG and corresponding initial clusters associated with first entities are received along with a dynamic data stream having second documents referencing second entities. Clustering on the second documents based on the set of initial clusters, and document features of the second documents, is performed to provide a set of second document clusters. For second document clusters that should be modified based on entities associated with the second document cluster, a cluster modification operation is performed. Updated clusters are generated based on the clustering and modification of clusters. Entity re-resolution is dynamically performed on the entities in the KG based on the second entities associated with the updated clusters to generate an updated knowledge graph data structure.

20 Claims, 14 Drawing Sheets

(56) References Cited

U.S. PATENT DOCUMENTS

| | | | |
|---|---|---|---|
| 2023/0135407 A1* | 5/2023 | Saha | G06F 16/285 707/739 |
| 2024/0005244 A1* | 1/2024 | Vangala | G06Q 10/06311 |
| 2024/0045896 A1* | 2/2024 | Saha | G06N 3/042 |
| 2024/0152557 A1* | 5/2024 | Ameen | G06N 3/045 |

OTHER PUBLICATIONS

Agrawal, Monica et al., "Large-scale analysis of disease pathways in the human interactome", Pacific Symposium on Biocomputing 2018, Jan. 3-7, 2018, 12 pages.

Bhattacharya, Indrajit et al., "A Latent Dirichlet Model for Unsupervised Entity Resolution", Proceedings of the Sixth SIAM International Conference on Data Mining, Apr. 2006, 9 pages.

Chakaravarthy, Venkatesan T. et al., "Efficient Scaling of Dynamic Graph Neural Networks", arXiv:2109.07893v1 [cs.DC], Sep. 16, 2021, 26 pages.

Dhani, Jaspreet S. et al., "Similar Cases Recommendation using Legal Knowledge Graphs", KGKDD '21, Aug. 14, 2021, version submitted is arXIV:2017.04771v1 [cs.AI], Jul. 10, 2021, 4 pages.

Du, Nan et al., "Dirichlet-Hawkes Processes with Applications to Clustering Continuous-Time Document Streams", 21st ACM SIGKDD Conference on Knowledge Discovery and Data Mining (KDD '15), Aug. 10-13, 2015, 10 pages.

Franzoni, Valentina et al., "Efficient Graph-based Author Disambiguation by Topological Similarity in DBLP", 2018 IEEE First International Conference on Artificial Intelligence and Knowledge Engineering (AIKE), Sep. 26-28, 2018, 5 pages.

Ganesan, Balaji et al., "Anu Question Answering System", CEUR Workshop Proceedings, Proceedings of the ISWC 2020 Demos and Industry Tracks: From Novel Ideas to Industrial Practice co-located with 19th International Semantic Web Conference (ISWC 2020), vol. 2721, Nov. 1-6, 2020, 2 pages.

Ganesan, Balaji et al., "Explainable Entity Matching Master Data Management", Thirty-eighth International Conference on Machine Learning (ICML Expo 2021), Jul. 17, 2021, 10 pages.

Ganesan, Balaji et al., "Link Prediction using Graph Neural Networks for Master Data Management", arXiv:2003.04732v2 [cs.SI], Aug. 28, 2020, 10 pages.

Hamilton, William L. et al., "Inductive Representation Learning on Large Graphs", 31st Conference on Neural Information Processing Systems (NIPS2017), Dec. 4- 9, 2017, 11 pages.

Huang, Yanping et al., "GPipe: Efficient Training of Giant Neural Networks using Pipeline Parallelism", 33rd Conference on Neural Information Processing Systems (NeurIPS 2019), Dec. 8-14, 2019, 10 pages.

Pareja, Aldo et al., "EvolveGCN: Evolving Graph Convolutional Networks for Dynamic Graphs", The Thirty-Fourth AAAI Conference on Artificial Intelligence (AAAI-20), Feb. 7-12, 2020, 8 pages.

Poux-Medard, Gael et al., "Powered Hawkes-Dirichlet Process: Challenging Textual Clustering using a Flexible Temporal Prior", arXiv:2109.07170v1 [cs.LG], Sep. 15, 2021, 10 pages.

Rakib, MD Rashadul Hasan et al., "Short Text Stream Clustering via Frequent Word Pairs and Reassignment of Outliers to Clusters", Proceedings of the ACM Symposium on Document Engineering 2020 (DocEng '20), Sep. 29-Oct. 1, 2020, 4 pages.

Saeedi, Alieh et al., "Incremental Multi-source Entity Resolution for Knowledge Graph Completion", Extended Semantic Web Conference (ESWC) 2020, May 2020, 17 pages.

Saha, Avirup et al., U.S. Appl. No. 17/518,195, filed Nov. 3, 2021, titled "Bucketing Records Using Temporal Point Processes", 44 pages.

Saha, Avirup et al., "Short Text Clustering in Continuous Time Using Stacked Dirichlet-Hawkes Process with Inverse Cluster Frequency Prior", 7th SIGKDD Workshop on Mining and Learning from Time Series (MileTS '21), Aug. 14, 2021, 5 pages.

Vannur, Lingraj S. et al., "Data Augmentation for Fairness in Personal Knowledge for Base Population", 25th Pacific-Asia Conference on Knowledge Discovery and Data Mining (PAKDD2021), May 11-14, 2021, 10 pages.

You, Jiaxuan et al., "Position-aware Graph Neural Networks", arXiv:1906.04817v2 [cs.LG], Jun. 13, 2019, 10 pages.

Zhang, Dalong et al., "Agl: A Scalable System for Industrial-purpose Graph Machine Learning", arXiv:2003.02454v4 [cs.SI], Mar. 16, 2020, 12 pages.

Zhu, Rong et al., "AliGraph: A Comprehensive Graph Neural Network Platform", Proceedings of the VLDB Endowment, vol. 12, No. 12, Aug. 2019, 12 pages.

Qin et al., "Seign: A Simple and Efficient Graph Neural Network for Large Dynamic Graphs", 2023 IEEE 39th International Conference on Data Engineering (ICDE), Jul. 26, 2023, 14 pages.

* cited by examiner

Algorithm 2 Preprocessing

Require: A set of Documents D
Ensure: A Spark RDD, docRDD, a map doc2clsID, a map topic2clsID, the number of clusters cls_no 1: clsID = 1, docID = 1
2: initialize dictionary topic2clsID = {}
3: initialize dictionary doc2clsID = {} }  — 310
4: for doc in D do
5:   Compute word_distribution and word_count
6:   triple = (doc.timestamp, doc.word_distribution, doc.word_count)
7:   insert map (docID, triple) in docRDD }  — 312
8: if doc.topic is NULL then
9:   continue
10: if topic2clsID.get(doc.topic) returns NULL then
11:   insert map (doc.topic, clsID) in topic2clsID
12:   insert map (docID, clsID) in doc2clsID
13:   clsID += 1
14: else
15:   topicClsID = topic2clsID.get(doc.topic)
16:   insert map (docID, topicClsID) in doc2clsID }  — 314
17: docID += 1
18: cls_no = clsID
19: return docRDD, doc2clsID, topic2clsID, cls_no }  — 316

Algorithm 3 Cluster Initialization

Require: docRDD, doc2clsID, cls_no
Ensure: Particle object p

1: p = Particle() //Initialize particle p
2: p.clusters = {} (Empty map)
3: p.cluster_times = {} (Empty map) }  — 320
4: for clsID in 1 to cls_no do
5:   p.clusters[clsID] = Cluster()
6:   p.clusters[clsID].word_distribution = $0_{|V|}$
7:   p.clusters[clsID].word_count = 0
8:   p.cluster_times[clsID] = [] }  — 322
9: for each partition P in docRDD do
10:  for docID in P do
11:    timestamp, word_distribution, word_count = P.get(docID)
12:    clsID = doc2clsID.get(docID)
13:    p.clusters[clsID].word_distribution += word_distribution //vector add
14:    p.clusters[clsID].word_count += word_count
15:    p.cluster_times[clsID].append(timestamp) }  — 324
16: for clsID in p.clusters do
17:  SORT(p.cluster_times[clsID])
18:  p.clusters[clsID].alpha = estimateAlpha(p.cluster_times[clsID]) }  — 326

*FIG. 3B*

Algorithm 4 Cluster Update

Require: docRDD, a set of new documents D2, old particle p
Ensure: Updated particle p, updated docRDD2

330
1: Run Algorithm 2 on D2 to get docRDD2
2: for each partition P in docRDD2 do 332
3:  for docID in P do
4:   timestamp, word_distribution, word_count = P.get(docID)
5:   clsID = sample_cluster_label(p, timestamp, word_distribution, word_count)

334
6:   if clsID is 0 then //case of new cluster
7:    discard docRDD2 //Sequential processing needed
8:    blocks = {D2[:k], D2[k + 1 : 2k], ...} //Split D2 sequentially in k-sized blocks
9:    for i in 1 to len(blocks) do
10:     flag = 0
11:     for doc in blocks[i] do
12:      triple = (doc.timestamp, doc.word_distribution, doc.word_count)
13:      Update particle p with doc outside Spark context
14:      Insert map (docID, triple) in docRDD
15:      if no new cluster is created then
16:       flag = 1
17:     if flag=1 then
18:      D2 = blocks[i + 1:] + i × k new documents from stream
19:      Goto line 1

336
20:   p.clusters[clsID].word_distribution word_distribution //vector add
21:   p.clusters[clsID].word_count += word_count
22:   p.cluster_times[clsID].append(timestamp)

338
23:  for clsID in p.cluster_times do
24:   SORT(p.cluster_times[clsID])
25:   p.clusters[clsID].alpha = estimateAlpha(p.cluster_times[clsID])
26: merge docRDD2 with docRDD

Algorithm 1 Overall algorithm

Require: An initial set of documents D with topic labels, a set of new documents D′ as updates to D with topic labels where a topic denotes an entity
Ensure: A clustering of D ∪ D′ by DHP in a distributed way 1: Preprocess each document in D to obtain a series of (timestamp, word distribution, word count) tuples as document features
2: Initialize DHP to the clustering of D induced by the topic labels and the parameters corresponding to the observed cluster feature distribution (set of document features in each cluster)
3: Obtain document features for each document in D′
4: Compute cluster labels for each document in D′ using the previously initialized DHP
5: Map topic labels of D ∪ D′ to cluster labels obtained in step 4
6: Re-resolve topics (entities) of D ∪ D′ according to cluster profile
7: Set D = D ∪ D′ and repeat the above for the next set of incoming documents D′

*FIG. 3D*

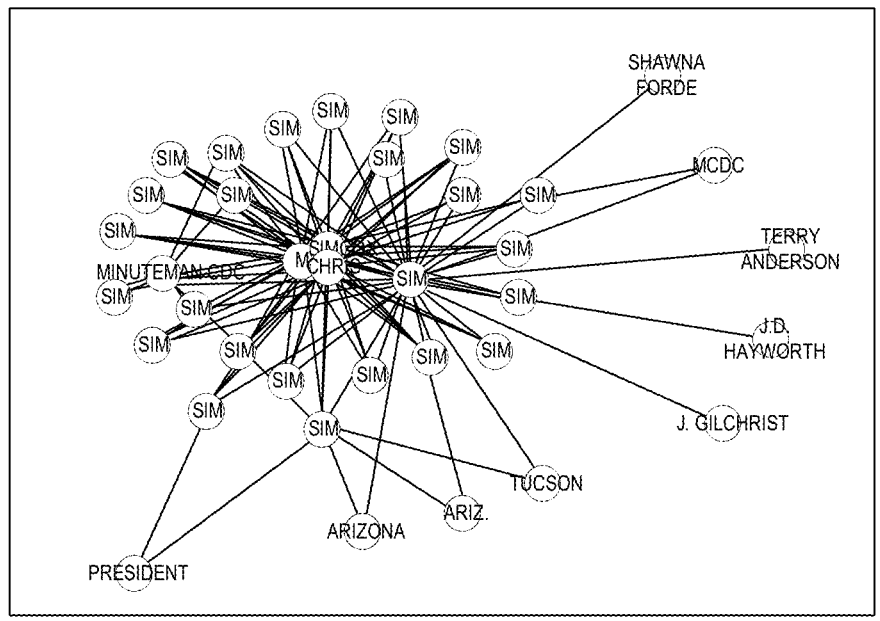
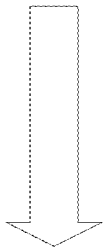
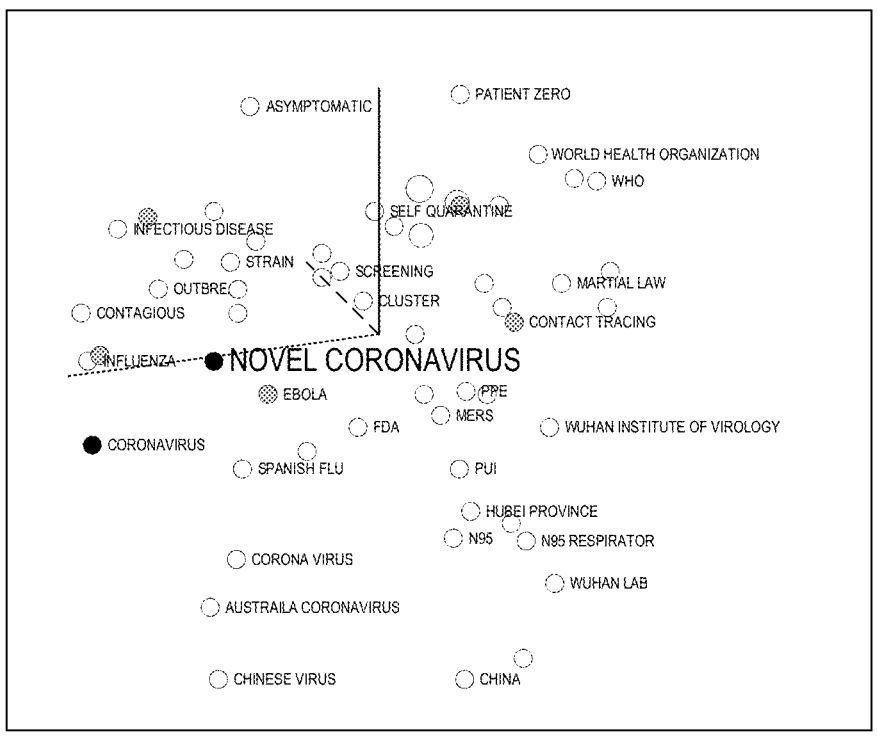
*FIG. 7*

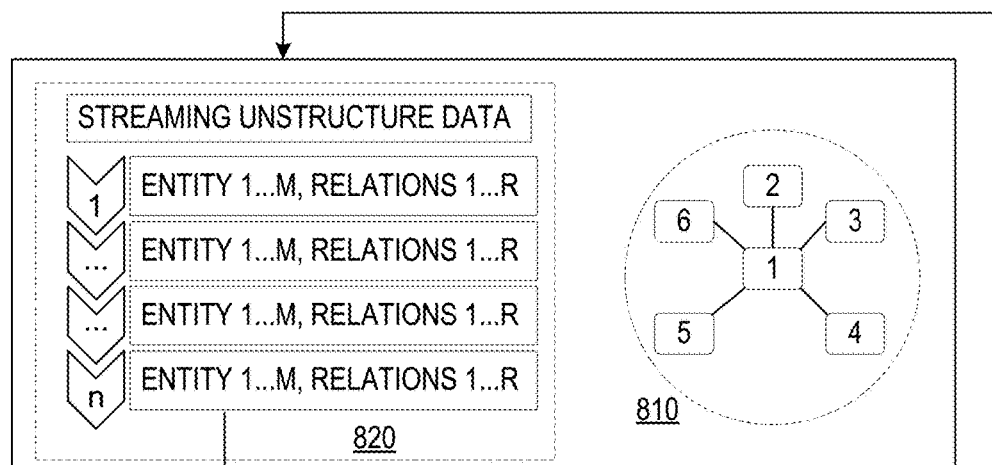
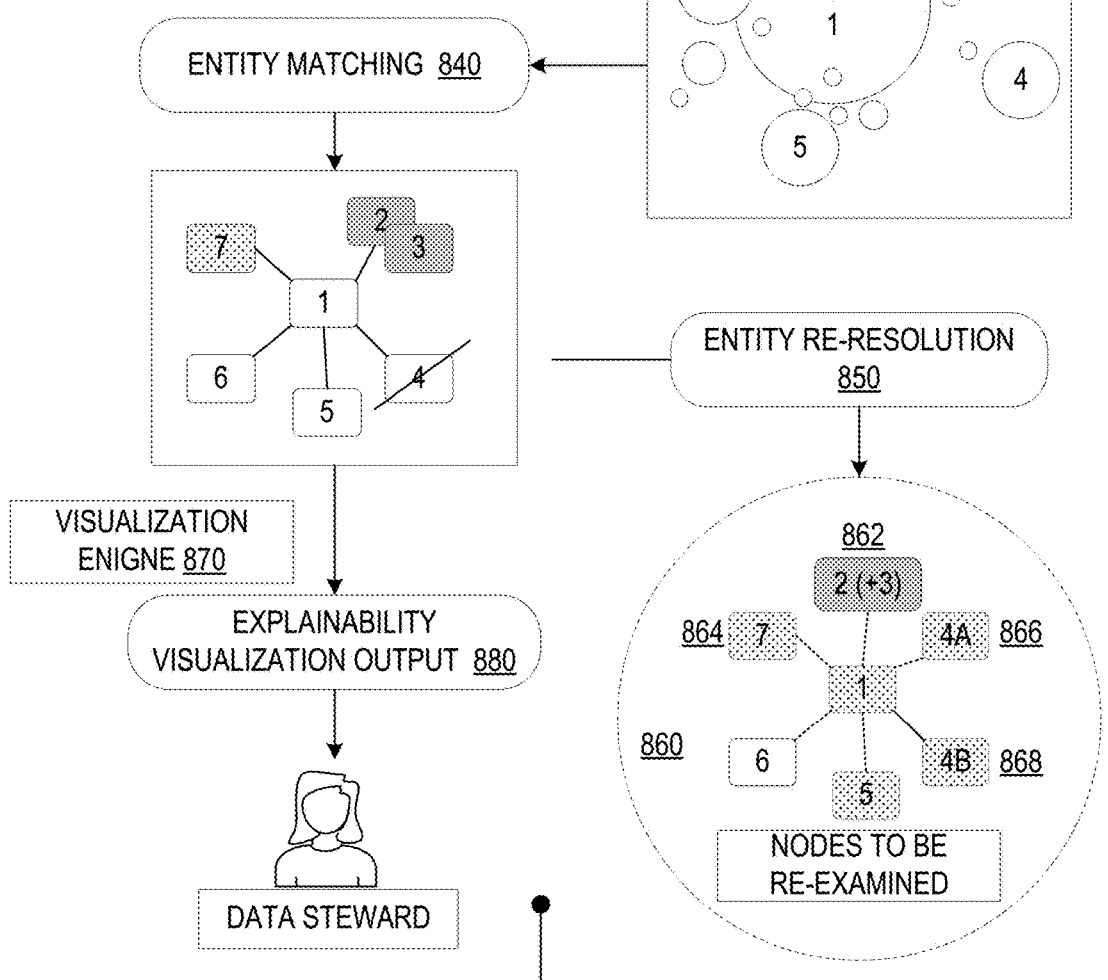
FIG. 8

DISTRIBUTED ENTITY RE-RESOLUTION BASED ON STREAMING UPDATES

BACKGROUND

The present application relates generally to an improved data processing apparatus and method and more specifically to an improved computing tool and improved computing tool operations for performing re-resolution of entities in a knowledge graph or property graph data structure based on streaming updates.

A knowledge graph, also known as a semantic network, represents a network of real-world entities, e.g., objects, events, situations, or concepts, and illustrates the relationship between them. This information is usually stored in a graph database and visualized as a graph structure. A knowledge graph is made up of three main components: nodes, edges, and labels. An entity, e.g., an object, place, person, event, situations, or concept, can be a node. An edge defines the relationship between the nodes. One node is referred to as the subject of the relationship, the label or type of the relationship represents the predicate, and the other node is referred to as the object of the relationship. Ontologies have a similar structure to knowledge graphs and may be built based on knowledge graphs.

Knowledge graphs, and ontologies, are typically made up of datasets from various sources, which frequently differ in structure. Schemas, identities, and context work together to provide structure to diverse data. Schemas provide the framework for the knowledge graph, identities classify the underlying nodes appropriately, and the context determines the setting in which the knowledge exists. These components help distinguish words with multiple meanings.

Knowledge graphs that are fueled by machine learning utilize natural language processing (NLP) to construct a comprehensive view of nodes, edges, and labels through a process referred to as semantic enrichment. When data is ingested, this process allows knowledge graphs to identify individual objects and understand the relationships between different objects. This working knowledge is then compared and integrated with other datasets, which are relevant and similar in nature. Once a knowledge graph is complete, it allows question answering and search systems to retrieve and reuse comprehensive answers to given queries.

A property graph data structure is similar to a knowledge graph but is a type of graph model where relationships not only are connections but also carry a name (type) and some properties, e.g., a name of "knows" and a property of "friend" or "co-worker". Property graphs are often used for modeling business facing models. Property graphs can have nodes and edges of different types, self-edges (ones whose source and destination nodes are the same), as well as multiple edges between the same source and destination nodes.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided that comprises receiving the knowledge graph data structure comprising data representations of a plurality of first entities specified in a first set of documents, and a corresponding set of initial clusters associated with corresponding ones of the first entities. The method further comprises receiving at least one dynamic data stream from at least one source computing system, the at least one dynamic data stream comprising second documents having data specifying second entities referenced by the second documents. Each second document is a collection of unstructured textual data. The method also comprises, automatically, in response to receiving the at least one dynamic data stream: (a) executing a clustering operation on the second documents based on the set of initial clusters, and document features of the second documents, to provide a set of second document clusters comprising the second documents; (b) determining, for each second document cluster in the one or more second document clusters, whether the second document cluster should be modified based on entities associated with the second document cluster; (c) executing, for each second document cluster that is determined should be modified, a cluster modification operation on the second document cluster, wherein updated clusters are generated comprising a combination of second document clusters that are modified and second document clusters that are not modified; and (d) dynamically executing entity re-resolution on the plurality of first entities in the knowledge graph data structure based on the second entities associated with the updated clusters to generate an updated knowledge graph data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a data processing system/apparatus is provided. The data processing system system/apparatus may comprise one or more processors and one or more memories coupled to the one or more processors. The one or more memories may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3A is an example of pseudocode for an algorithm that may be executed by a pre-processing engine for pre-processing a set of documents in accordance with one illustrative embodiment;

FIG. 3B is an example diagram of pseudocode for a cluster initialization algorithm which may be executed by a cluster initialization engine in accordance with one illustrative embodiment;

FIG. 3C is an example diagram of pseudocode for a cluster update algorithm that may be executed by the cluster update engine in accordance with one illustrative embodiment;

FIG. 3D is an example diagram of pseudocode of an entity re-resolution algorithm that may be executed by the entity re-resolution engine in accordance with one illustrative embodiment;

FIG. 7 is an example diagram of a visualization output that may be generated by the visualization engine based on the GNN embeddings generated by the visualization engine on the updated knowledge graph in accordance with one illustrative embodiment;

FIG. 8 is an example diagram illustrating an overall operation of an entity re-resolution engine in accordance with one illustrative embodiment;

DETAILED DESCRIPTION

Figure 1:
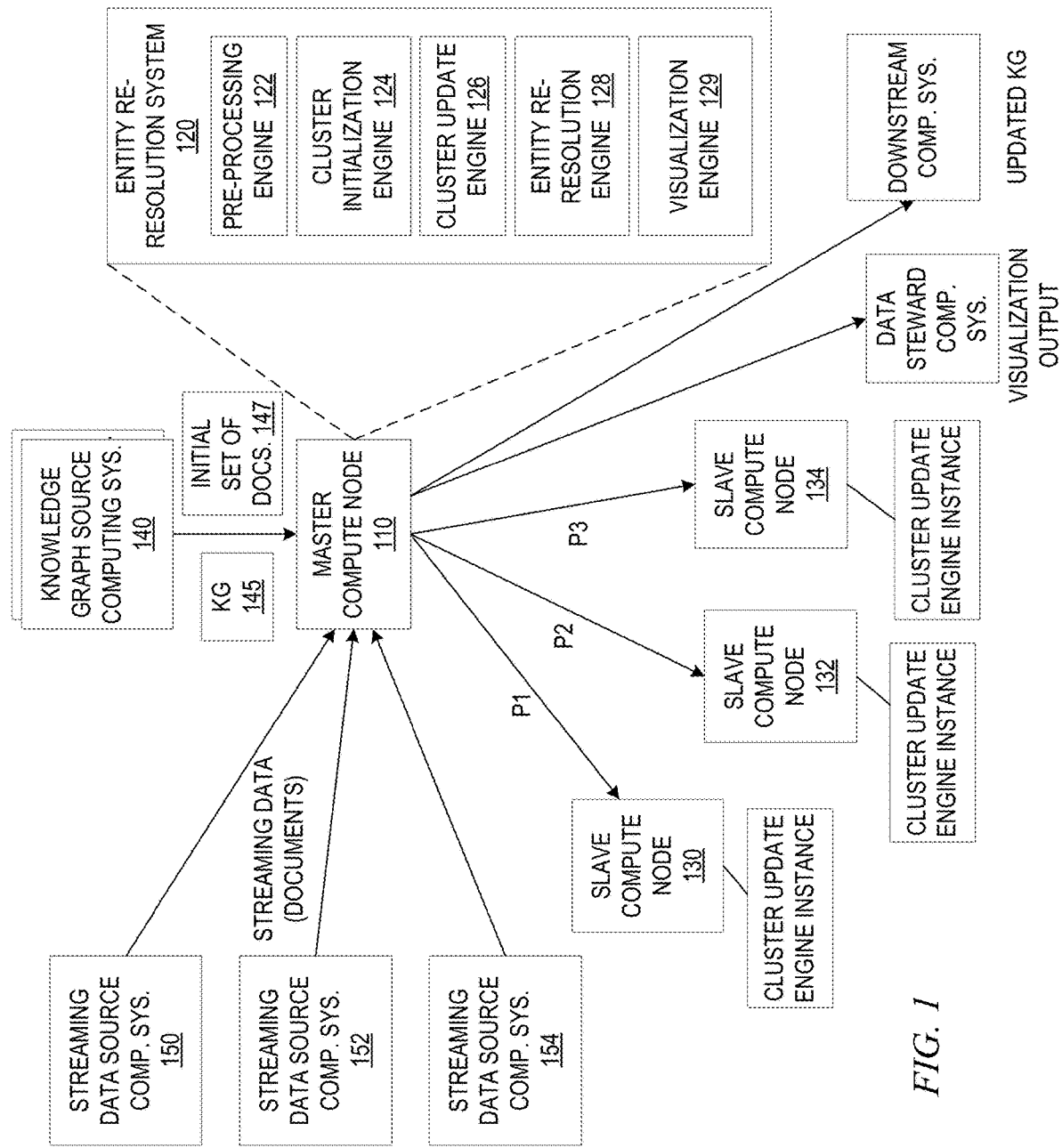
FIG. 1 is an example block diagram of the primary operational components of an improved entity re-resolution computing tool operation in accordance with one illustrative embodiment.

As noted above, the illustrative embodiments described herein provide an improved computing tool and improved computing tool operations for performing entity re-resolution of entities in a knowledge graph or property graph data structure based on streaming updates. The illustrative embodiments address the problems with computer based systems that rely on knowledge graphs and property graphs to perform their functionality by providing improved computer tool mechanisms to dynamically update the knowledge graphs/property graphs using distributed machine learning on streaming updates. It should be appreciated that references to knowledge graphs and property graphs herein refers to the data structures that define the graphs in a way that they can be processed and utilized in computing systems.

While knowledge graphs and property graphs provide great bases for information representation, they are static representations of knowledge. Thus, in areas where knowledge changes rapidly over time, the use of such knowledge graphs and property graphs is limited and may lead to inaccurate results by downstream computer processes, i.e., search engines, artificial intelligence operations, such as question answering and the like. For example, in social networking systems, the amount of dynamic interaction between individuals and the dissemination of information is performed rapidly such that static knowledge graphs/property graphs have limited uses where the entities involved are subjects of the social networking (for purposes of this description, references will be made to "knowledge graphs" but are intended to encompass other similar data structures, such as property graphs).

For example, hashtags and other designators of topics in social media, created by users, have temporal trends due to these hashtags and designators being tied to current events. Such hashtags become irrelevant after some time when the events are no longer prominent in the social conscience, are not trending, or the like. Moreover, several different hashtags may refer to the same entity or event, e.g., #corona, #coronavirus, etc. which may cause issues to downstream computing systems if they are not resolved. That is, downstream computing systems may not recognize these different hashtags as referencing the same entity or event if they are separately represented in the same or different knowledge graphs, and as a result may generate incorrect results when relying on the knowledge graphs.

Unlike topics in unstructured data, entities in a knowledge graph have attributes and are typically represented as attributed nodes, many of which may actually reference the same entities, but such a situation may not be readily apparent, e.g., a node for coronavirus and a node for SARs-nCOV-2 may be referencing the same or different entities, but it may not be clear from the knowledge graph. That is, merging of nodes in a knowledge graph is not a trivial question and may require much manual effort and subject matter expertise on the part of a person reviewing the knowledge graph. However, a resolved entity is richer and enables higher order abstractions that are used by Graph Neural Networks (GNNs) for node classification, link prediction, graph classification, and other tasks. Thus, there is a need for improved automated and artificially intelligent entity resolution computing tools and computing tool operations, and especially those that are able to operate on dynamically generated/received streaming updates to the knowledge represented in knowledge graphs.

In knowledge and property graphs used in enterprises, previously resolved entities may have to be re-resolved as more information becomes available. For example, from the acquisition of a new data source, merging of companies and hence their customer data among other types of data, new information is made available that may render the knowledge or property graphs inaccurate or incomplete. Thus, the temporal aspects of entity resolution and the introduction of new data in a dynamic manner may greatly affect the accuracy and ability of downstream computing tools that operate based on knowledge graph, property graph, or other structured representations of entities and relationships between entities to perform their tasks, such as complex analytics pipelines, artificial intelligence and cognitive computing systems, and the like.

In order to address the issues of computing systems that operate based on static knowledge graphs, property graphs, or the like, or such data structures which are only periodically updated, the illustrative embodiments provide an improved computing tool and improved computing tool operations directed to performing dynamic re-resolution of entities in such structures based on dynamically streaming data in a distributed manner. The illustrative embodiments provide an entity re-resolution computing tool that operates to cluster unstructured data using a distributed clustering approach, such as a distributed Dirichlet Hawkes process (DHP), or the like. The illustrative embodiments provide improved computing tool mechanisms to merge and/or split clusters based on updates from streaming data in a distributed manner and thereby re-resolve entities in the knowledge graph, property graph, or similarly structured entity-relationship based data structure. Hereafter, the present description will make reference to simply a "knowledge graph" data structure, which is considered to also reference property graphs and similar such data structures for ease of explanation, where references to a "knowledge graph" or "knowledge graph data structure" are considered to be interchangeably referencing a specific type of computer data structure and not an abstract concept. In addition, the illustrative embodiments provide an improved computing tool and improved computing tool operations for generating and providing a visualization of the computing tool's reasoning for the re-resolution and the corresponding sub-graph and node embeddings.

The illustrative embodiments assume that there is an existing knowledge graph data structure in which entities and relationships between entities are specified. The existing knowledge graph data structure may be generated using any known or later developed computing mechanisms including, but not limited to, the Master Data Management (MDM) computing system tools and solutions available from International Business Machines (IBM) Corporation of Armonk, New York. IBM's MDM provides an artificial intelligence and machine learning based mechanism to provide a single, trusted 360-degree view into customer, product, and location data across an enterprise. IBM's MDM provides computing tools for matching data and reconciling data differences, creating repositories of product and service information that can be used through organizations to achieve strategic business initiatives, and generating deep insights into an enterprise's data by employing such artificial intelligence tools as the IBM Watson® cognitive computing system available from IBM.

Given an existing knowledge graph data structure, the illustrative embodiments provide improved computing tools and improved computing tool operations, which may operate in conjunction with such tools as IBM's MDM, or may be integrated into such tools, to dynamically and in a distributed fashion, perform entity re-resolution on the entities present in the given knowledge graph, as well as expand the knowledge graph dynamically for new entities identified in streaming data that do not already exist in the knowledge graph and are not sufficiently related to existing entities in the knowledge graph. The streaming data may be data from various source computing systems, such as social media website updates, various feeds from various sources, such as dynamic news feeds and the like, edits to relational data, logs, and the like, etc.

With the existing knowledge graph, each entity (also sometimes referred to as a "topic") has its own text cluster, obtained from the source streaming data, and these text clusters are used to initialize dynamic clustering of entities identified in streaming data. The dynamic clustering operates to merge and/or split clusters based on an analysis of the clusters such that entities (or topics) that only occur in the same cluster are merged such that only a single topic remains, and an entity (or topic) is split if it is substantially evenly distributed between two clusters. In some illustrative embodiments, a rules-based engine executes computer executable rules that process the clusters by analyzing the clusters individually and across the plurality of clusters to determine whether particular clusters should be merged and/or split based on specified criteria. As noted above, one such computer executable rule for merging clusters may be to analyze the clusters and determine if a cluster corresponds to multiple entities (or topics) and those entities (or topics) are only present in that one cluster. If such a condition is present, the computer executable rules may further determine whether the characteristics of that cluster warrant a merging of the entities (or topics) into a selected one of those entities (or topics).

In another example, one such computer executable rule for merging clusters may be to analyze the clusters and determine if a particular entity (or topic) is present in multiple clusters and if so, determine the distribution of that entity (or topic) across the multiple clusters and whether that distribution warrants a splitting of the entity (or topic) into two or more entities (or topics) which may be considered an entity (or topic) and a sub-entity (or sub-topic). In splitting the entity or topic between clusters, outliers or a smallest sub-cluster of the cluster that is being split may be selected to generate a new cluster and a corresponding second entity or topic.

It should be appreciated that while a computer executable rules-based engine is provided as one example implementation of the illustrative embodiments, other illustrative embodiments may utilize other artificial intelligence computer mechanisms for executing the improved computer functionality of the illustrative embodiments. For example, in other illustrative embodiments, one or more trained neural network computer models may be configured to perform the analysis of the clusters and determine when to merge/split clusters and how to merge/split clusters, so as to achieve a similar improved computer functionality as the computer executable rules-based engine. These one or more trained neural network computer models may be neural network computer models that are trained through machine learning processes on training data having given clusters of entities (or topics) with associated ground truth results to train the operational parameters of the neural network computer models to reduce error and generate correct results as to when to merge/split clusters and how to merge/split clusters. In addition, it should be appreciated that other types of computer models may likewise be configured to perform the improved computer functionality of the illustrative embodiments, including convolutional neural networks (CNNs), deep neural networks (DNNs), long short-term memory (LSTM), graph neural networks (GNNs), and the like. Any suitable machine learning trained or specifically configured computer model that is specifically configured to perform the improved computer functionality of the illustrative embodiments may be implemented in the illustrative embodiments without departing from the spirit and scope of the present invention.

In one illustrative embodiment, as unstructured data is streamed, such as through a social networking computer system, such as Twitter®, Instagram®, Facebook®, a news feed, or the like, or through another data streaming service, the metadata and/or textual content of the unstructured data may be processed to perform entity recognition and extract entities and their relationships from the metadata and textual data content over a given period of time. These entities and relationships may be input to an entity clustering algorithm that takes into consideration the temporal characteristics associated with the entities and relationship mentions in the metadata/textual content of the streaming data. For example, in some illustrative embodiments, a Dirichlet Hawkes Process (DHP) may be employed to cluster the entities into a plurality of clusters, where this DHP algorithm may be modified in accordance with the illustrative embodiments to be distributed across a plurality of computing devices (it should be noted that DHP is a sequential process and thus, is not itself distributable without the modifications made by the illustrative embodiments). Each cluster may be associated with a corresponding entity (or topic) and these entities or topics may be submitted to entity matching logic that uses the entities in the original knowledge graph to attempt to match the entities of the streaming data with these entities in the original knowledge graph. Based on the entity matching logic, clusters of entities (or topics) from the streaming data may be generated and then the merge/split computer model (s) are executed on the clusters to determine a final set of clusters and their corresponding entities (or topics).

This process may be performed in a dynamic and distributed manner across multiple computing devices as streaming data is being received by those computing devices. In this way, entity (or topic) re-resolution is performed in a dynamic and distributed manner and the nodes corresponding to the re-resolved entities (or topics) may be updated in the corresponding knowledge graph. The resulting dynamically updated knowledge graph may be provided to downstream computing systems which operate on such knowledge graphs to perform their operations, such as various types of cognitive computing systems comprising computer executed natural language processing, machine learning computer model processing, GNNs, and the like. As the knowledge graph entities are re-resolved in a dynamic manner, the knowledge graph is more accurate than the static knowledge graphs and provides improved accuracy of results generated by these downstream computing systems.

In addition, the illustrative embodiments provide mechanisms for providing a visualization output for explaining the re-resolution of similar entities (or topics) in the knowledge graph and streaming data. That is, the dynamically updated heterogeneous (nodes of different types of entities or topics) knowledge graph may be provided as input to a graph neural network (GNN) which generates GNN embeddings providing the characteristics, for each node in the graph, of that node's neighborhood of connected nodes within the knowledge graph, where the neighborhood may be defined by a specified number of nodes, edges, or "hops" from the given node. By projecting the GNN embeddings of nodes after re-resolution, the mechanisms of the illustrative embodiments are able to show the proximity of re-resolved entities which may be closer in update times, even if they are distant in terms of concept, e.g., Wuhan, a location, is not closer to COVID19, a disease, without the temporal proximity, and during a time period (2019-2020).

It should be appreciated that in this description, reference will be made to "documents" which are considered to be portions of text data received as streaming data. These portions of text data may be of any size, such as individual posts to social networking websites, headlines from news feeds, words, sentences, passages, or multiple page documents. A "document" in the context of the present description is considered to be a collection of words such that the streaming data may comprise multiple documents provided over time. In some illustrative embodiments, these documents have associated metadata specifying the entities (or topics) associated with these documents, or such entities (or topics) may be determined through computerized natural language processing being executed by one or more computing devices on these documents to perform entity recognition and/or topic identification and analysis. For ease of explanation herein, it will be assumed that each document will have a single associated entity (or topic) which is the focus of that document such that there may be a one-to-one mapping of documents to their corresponding entities (or topics), however in other illustrative embodiments there may be a one-to-many mapping in which documents may have multiple different entities (or topics) in which case the mechanisms of the illustrative embodiments described herein will represent different instances of the same document with different entities (or topics), which may in fact be merged/split in accordance with the illustrative embodiments.

In some cases, the documents may be retrieved in a dynamic manner from various sources using an information retrieval computer system that performs keyword searches of information sources to retrieve documents corresponding to desired topics. In such cases, the keywords used in the keyword searches may be associated with the retrieved documents as corresponding entities (or topics) of those documents. An example of such a set of streaming documents with topics derived from an information retrieval system is found in a set of news articles with predefined topics identified by a reliable source, such as a news aggregator and segregator. As a use case example of the documents in the streaming data, consider that if there is an existing knowledge graph about politicians or celebrities, and it is desired that this knowledge graph be dynamically updated using the entity re-resolution mechanisms of the illustrative embodiments, a first operation would be to search one or more data sources, such as via the Internet or other distributed data network, for new documents related to these politicians and celebrities, e.g., using the names or other identifiers of the politicians or celebrities as search terms, and then these politicians or celebrities would be the entities or topics of the retrieved documents, e.g., the search terms may be associated with the retrieved documents as metadata describing the content of the retrieved documents.

The terms "entity", "topic", and "node" of the knowledge graph may be used in an interchangeable manner in this description, however these terms have slightly different connotations. An entity in a knowledge graph can be objects, events, situations, or concepts. A node in the knowledge graph is the data structure that represents that entity. In the case of unstructured text documents, such as may be received via the streaming data of the illustrative embodiments, each document may have an associated topic which is a real-world concept, e.g., a document could be about a celebrity, in which case the celebrity will be the topic, or the document could be about a sporting event in which case the sporting event is the topic. Thus, the topic of a document may also be an entity in the knowledge graph, and the node in the knowledge graph may represent that entity, e.g., the sporting event, such as the Super Bowl, may be the topic of a document, an entity in a knowledge graph, and may be represented by a corresponding node in the knowledge graph. Rather than referencing all three representations of a real-world concept throughout this disclosure, it should be appreciated that these three representations may be used interchangeably herein in view of the differences in connotation noted above.

As noted above, documents have associated entities, topics, and nodes, which again are interchangeable but have different connotations. In accordance with the illustrative embodiments, documents may be clustered by a document clustering algorithm that is modified for distributed processing across a plurality of compute nodes, e.g., computing devices, processors, or the like, such that different compute nodes, simply referred to herein as computing devices to avoid confusion with nodes of a knowledge graph, may operate on different portions of the streaming data at approximately the same time. A "cluster" refers to a set of documents which may or may not share the same topic but have one or more attributes, which may be the topics and/or other attributes, that have similarities that make the documents in the cluster more similar to each other than other documents, such as documents in other clusters or outlier documents. The merging/splitting of a cluster refers to the merge or split of the set of documents corresponding to the cluster. For example, if a cluster has documents with one or more topics that only exist within that one cluster, then those topics may be merged and associated with the cluster. If a cluster has documents with a topic that appears in multiple clusters, then the documents may be split into two clusters, each cluster having its own unique set of one or more topics, e.g., outlier documents of the original cluster may be split into a separate cluster with a separate set of one or more topics.

In one illustrative embodiment, the overall improved computer tool operations for performing the entity re-resolution using streaming data assumes an initial set of documents D with topic labels and a previously existing knowledge graph having nodes and edges representing entities (or topics) and their corresponding relationships, e.g., one topic or entity is related to another topic or entity. Given a new set of documents D' as updates to the initial set of documents D, again with topic labels where the topic denotes an entity, e.g., a politician, celebrity, sporting event, or the like, in the examples mentioned above, the operation ensures a clustering of D∪D' by a clustering algorithm in a distributed way. In particular, in accordance with one illustrative embodiment, each document in D is pre-processed by a pre-processing engine executing a pre-processing algorithm to obtain a series of tuples as document features. The tuples may comprise, for example, document features of a document timestamp, a computed document word distribution, and a computed word count (total number of words in the document). The distributed clustering engine is initialized to perform clustering of D induced by the topic labels and the parameters corresponding to the observed cluster feature distribution, i.e., set of document features in each cluster. The initialization of the distributed clustering engine is performed based on the topics of the existing documents D to estimate the clustering algorithm parameters, e.g., DHP algorithm parameters. In the case of a DHP algorithm based embodiment, the tuples for the documents provide the data format used by the DHP algorithm's Sequential Monte Carlo sampling to determine cluster labels for new documents.

Having initialized the distributed clustering engine, the document features for the new documents D' are similarly computed as corresponding tuples. Clustering of the new documents D' is performed with regard to the initial set of clusters for the initial set of documents D so as to generate the cluster labels for each document in D' based on the initialized distributed clustering engine. The topic labels of D∪D' are mapped to cluster labels computed for the new documents D'. It should be appreciated that while for the initial set of documents D the topic labels are the cluster labels, this may not necessarily be true for the subsequent new documents D' whose cluster labels are computed by the initialized distributed clustering engine, e.g., DHP algorithm in some illustrative embodiments. In such cases, the topic labels and cluster labels may not match, but the topic label may be mapped to the cluster label, yielding a distribution of topic labels per cluster.

The topics (or entities) of D∪D' are re-resolved according to the cluster profile, i.e., the distribution of topic labels in the cluster. The re-resolution of the topics or entities involves merging and/or splitting clusters, i.e., the documents in the clusters, according to the topics and the application of the computer executed rules and/or trained machine learning computer models on the topics or entities of the clusters of D∪D'. Thus, while the documents are clustered based on features of the documents, such as specified in the tuple representations, the corresponding entities of those documents that are now associated with the clusters in which those documents are clustered, are used as a basis for performing merge/split operations on the clusters. The final set of merged/split clusters are then used to update the knowledge graph nodes and provide a visualization output, such as by projecting GNN encodings on the knowledge graph, explaining the reasoning for the re-resolved topics/entities in the knowledge graph. The initial set of documents is set to D∪D' and the process is then repeated with the next set of incoming documents D' in the streaming data.

The distributed clustering engine of the illustrative embodiments comprises a clustering initialization engine and a cluster update engine that are specifically configured to execute clustering initialization and clustering update algorithms, respectively. These clustering initialization and clustering update algorithms may utilize data structures that facilitate distributed execution of clustering, where these data structures may be generated by the execution of the pre-processing engine on the set of documents D and on the new set of documents D'. In some illustrative embodiments, these data structures are resilient distributed dataset (RDD) data structures which may be provided in parallel processing frameworks, such as Apache® Spark™, or the like (Apache® is a registered trademark of Apache Software Foundation and Spark™ is a trademark of Apache Software Foundation). It should be appreciated that other structures, such as DataFrames and Datasets in Apache® Spark™, may also be utilized.

The clustering initialization and clustering update algorithms, in some illustrative embodiments, may employ a modified Dirichlet-Hawkes Process (DHP) algorithm that is modified for distributed execution. In other illustrative embodiments, other clustering initialization and update algorithms may include, but are not limited to, Hierarchical Dirichlet Hawkes Process (HDHP), Hierarchical Dirichlet Gaussian Marked Hawkes Process (HD-GMHP), a Stacked Dirichlet Hawkes Process with inverse cluster frequency (ICF) prior (see Saha et al., "Short Text Clustering in Continuous Time Using Stacked Dirichlet-Hawkes Process with Inverse Cluster Frequency Prior," MileTS '21, Aug. 14, 2021), and the like.

In some illustrative embodiments, the operation of the clustering initialization and clustering update algorithms on data structures designed for distributed dataset processing, such as the RDD data structures noted above, permits distributed execution of such clustering algorithms that are otherwise sequential. Moreover, these algorithms themselves are modified to permit determinations of when sequential execution of the algorithm must be performed and when distributed execution is permitted. In one illustrative embodiment, this determination involves determining whether a new cluster is needed as part of the cluster updating or not, and if a new cluster is needed, then sequential execution of the clustering algorithm is performed, whereas if a new cluster is not needed, i.e., clustering of a new document can be performed with the existing clusters and does not need a new cluster for the new document, then distributed processing of the clustering may be performed. The distributed processing of the clustering may be executed and the results merged with the original clusters so as to merge/split clusters if needed and generate an updated clustering of documents and topics that are then used to update the knowledge graph and provide a visualization output indicating reasoning for the updates to the knowledge graph, i.e., reasoning for the re-resolution of entities in the knowledge graph, based on GNN embeddings.

Thus, the illustrative embodiments provide mechanisms that improve the state of knowledge graphs used by computing systems to perform artificial intelligence and machine learning based operations. The improvement is provided through an improved computing tool and improved computing tool operation that provides dynamic re-resolution of entities of a knowledge graph based on streaming data using a distributed clustering engine and distributed clustering algorithm, such as a modified DHP algorithm. The illustrative embodiments transform static knowledge graph data structures into dynamically updated knowledge graph data structures that may be frequently and even continuously updated automatically based on the availability of new documents in streaming data.

By providing an improved computing tool and improved computing tool functionality that is able to dynamically and automatically update knowledge graph data structures using entity re-resolution, and do so in a distributed manner, the mechanisms of the illustrative embodiments are able to make the knowledge graphs dynamic, rather than static, and keep them up-to-date with temporal trends, e.g., see the discussion of hashtags above. Moreover, as new references to the same or substantially the same topics are created, or old references to the same or substantially the same topics are no longer utilized, the knowledge graph may be dynamically and automatically adjusted to reflect such trends over time. The re-resolved entities provide richer and higher order abstractions that can be used by Graph Neural Networks (GNNs) for node classification, link prediction, graph classification, and other downstream computing system tasks that facilitate artificial intelligence computing system operations.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

While the above description provides an overview of software, hardware, and the configuration of such software, hardware, and such to implement various "engines", it should be appreciated that any references to generic computing hardware is intended to refer to merely the hardware itself in cases where the hardware is not modified. However, even if, in some embodiments, generic computing hardware is used as a basis, the invention is not in the generic computing hardware, but rather the specifically configured software and hardware mechanisms that, only through such specific configuration, permit the described inventive computer tool functionalities to be realized. That is, for a computing tool to provide improved or inventive computing tool functionality, the computing tool relies on a combination of hardware and software that together define the improved computing tool functionality, unless new hardware is specifically described that hard wires this specific configuration into a new arrangement of circuitry. Hence, even in embodiments where the "engines" are implemented in software executing on computer hardware which configures that computer hardware to perform the particular improved computing tool functionalities of the embodiment, the embodiment is describing an improved computer functionality and improved computing tool and not an abstract idea for which computers are merely used as a tool. The embodiments described herein are not directed to any abstract idea of the invention, but rather to a practical application of an improved computing tool and improved computing tool functionality.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, the illustrative embodiments of the present invention are specifically directed to an improved computing tool that automatically performs entity re-resolution of entities present in knowledge graph data structures based on streaming data and dynamic distributed clustering engines and clustering algorithms. All of the functions of the illustrative embodiments as described herein are intended to be performed using automated processes without human intervention. While a human being may benefit from a visualization output generated by the mechanisms of the illustrative embodiments to provide reasoning for the updates to the knowledge graph, the illustrative embodiments of the present invention are not directed to actions performed by the human being, but rather logic and functions performed specifically by the improved computing tool on the documents of streaming data to automatically and dynamically update a knowledge graph by implementing specific entity re-resolution tools and operations. Moreover, even though the present invention may provide a visualization output that ultimately assists human beings in evaluating the knowledge graph, the illustrative embodiments of the present invention are not directed to actions performed by the human being viewing the visualization output, but rather to the specific operations performed by the specific improved computing tool of the present invention which facilitate the entity re-resolution and knowledge graph updating in an improved manner, which ultimately may provide the visualization output that assists the human being, and also provides a more accurate knowledge graph for other downstream computing system utilization as input. Thus, the illustrative embodiments are not organizing any human activity, and are not directed to any mental process, but are in fact directed to the improved functionality of an improved computing tool.

FIG. 1 is an example block diagram of the primary operational components of an improved entity re-resolution computing tool operation in accordance with one illustrative embodiment. As shown in FIG. 1, a master compute node 110, e.g., a processor, a computing device, or the like, is specifically configured to execute a dynamic entity re-resolution system 120 in accordance with one or more of the illustrative embodiments that are described herein. The dynamic entity re-resolution system 120 comprises a pre-processor engine 122, a cluster initialization engine 124, a cluster update engine 126, a re-resolution engine 128, and a visualization generation engine 129. The master computer node 110 may operate with "slave" compute nodes 132-134 which may execute their own cluster update engine instances on partitions P1-P3 of a document dataset given to them by the master compute node 110 to perform cluster updating operations in a distributed manner as will be described hereafter. These compute nodes 132-134 may likewise be processors, computing devices, or the like.

The master compute node 110 receives an initial set of documents D from one or more source computing devices 140 which have a corresponding existing knowledge graph (KG) data structure 145. The existing KG data structure 145 may have been generated through any known or later developed mechanism for generating KG data structures, may have been generated through manual building of the KG by subject matter experts, or the like. The concepts of KGs and their generation/creation is known and thus, a detailed explanation is not provided herein. For example, the existing KG data structure 145 may be generated using the Master Data Management (MDM) computing system tools and solutions available from International Business Machines (IBM) Corporation of Armonk, New York. Regardless of the particular mechanisms used to generate the existing KG data structure 145, it is assumed for purposes of the description of the present invention that there is an existing KG data structure 145 that is provided to the master compute node 110 and which corresponds to a set of original documents D 147 that are also provided to the master compute node 110. For example, the set of original documents D 147 may be associated with a specific set of topics, e.g., politicians or celebrities, and the documents may have associated topics referencing entities that are the politicians/celebrities. These topics may be used as a basis for generating nodal representations in the KG data structure 145 where each node may represent a different politician/celebrity and their corresponding attributes and which have associated portions of text from the documents D 147 where these entities are referenced.

Figure 2A:
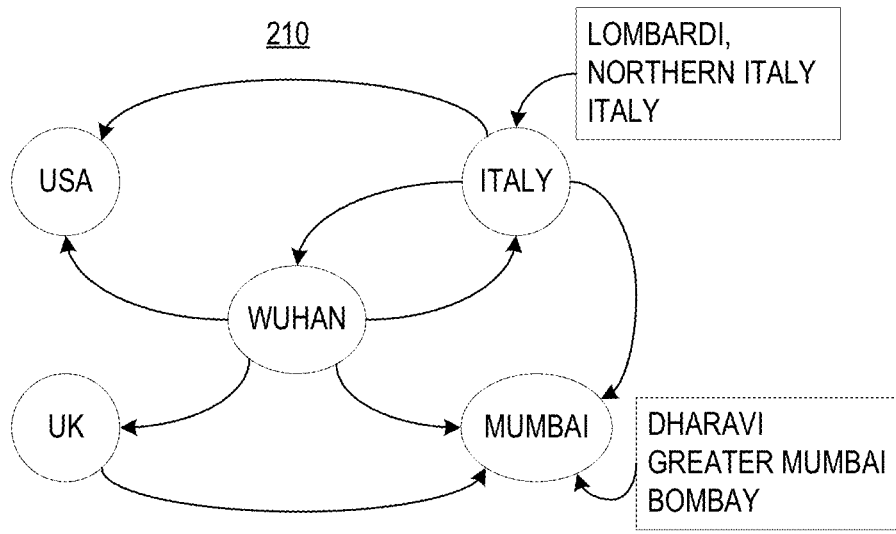
FIG. 2A is an example diagram of a homogenous knowledge graph in accordance with one illustrative embodiment.
Figure 2B:
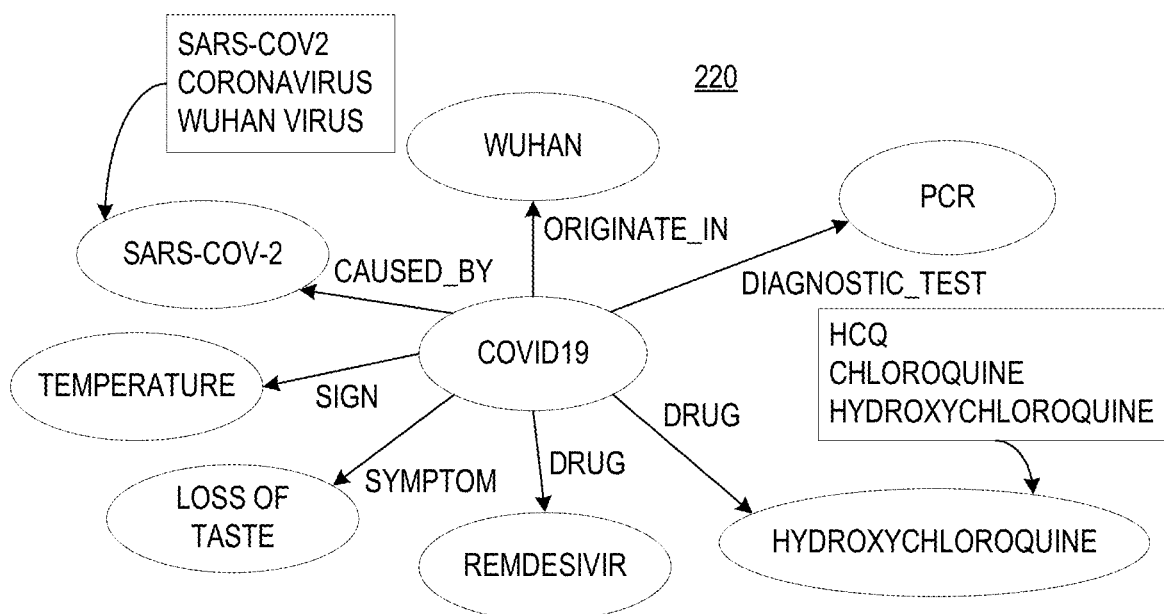
FIG. 2B is an example of a heterogeneous knowledge graph in accordance with one illustrative embodiment.

It should be appreciated that it is not required that the KG data structure 145 be homogeneous, i.e., all of the nodes represent entities of a same type, and in fact the KG data structure may be heterogeneous. FIGS. 2A and 2B are examples of a homogenous KG and a heterogenous KG, respectively. As shown in FIG. 2A, the homogenous KG 210 includes nodes that are all referencing geographical locations associated with "Wuhan", with the nodes for Italy and Mumbai further demonstrating additional attributes associated with those nodes corresponding to sub-regions of the geographical locations (others of the nodes may similarly have such attributes as well). As shown in FIG. 2B, the heterogeneous KG 220, while representing concepts related to "COVID19" has nodes representing various entities of different types with different types of relationships to COVID19, including drugs, symptoms, signs, diagnostic tests, causal relationships, etc.

With reference again to FIG. 1, the master compute node 110 also receives, from various source computing systems 150-154, streaming data with new documents D'. These source computing systems 150-154 may be any source of streaming data, such as social networking computer systems, news feed computer systems, various document aggregators and/or segregators, relational database systems, or the like. The documents D' have associated topics (or entities) which may be determined through a natural language processing operation executed by a natural language processing engine (not shown) executing on the master computing device 110 on these documents D' as they are received, may be provided in metadata associated with the documents D' themselves, such as may be provided by the source computing systems 150-154, or may be imputed to the documents D' based on keywords used to perform keyword based searches that result in the documents D' being retrieved and provided to the master compute node 110. For example, an aggregator may perform a search of the Internet for documents related to a particular topic using a keyword search and thus, these keywords reflecting the topic, or the topic itself, may be attributed to the resulting documents retrieved and subsequently provided to the master compute node 110, such as in metadata embedded in or otherwise associated with the documents, a separate data structure, or the like.

With the existing KG data structure 145, each entity has its own text cluster, obtained from the source document data D, and these entities are pre-processed by the pre-processing engine 122 to initialize, via the clustering initialization engine 124, of the dynamic clustering of entities identified in streaming data from source computing systems 150-154 performed by the cluster update engine 126. In accordance with some illustrative embodiments, the pre-processing engine 122 executes a pre-processing algorithm that creates data structures, such as RDD data structures, that permit distributed clustering operations for documents of an input dataset, e.g., original documents D and then new documents D' received as part of streaming data. For purposes of this description, it will be assumed that Apache® Spark™ RDD mechanisms are implemented, but as noted above, the illustrative embodiments are not limited to Apache® Spark™ and other data structures and architectures that permit distributed dataset processing may be used without departing from the spirit and scope of the present invention.

The pre-processing engine 122, as part of the creation of the distributed clustering data structure generation, generates, for each document D or D' in the input dataset, a tuple representation for that document that is part of an entry for that document in the distributed clustering data structure, e.g., the document RDD data structure (docRDD). The tuple provides various characteristics of the corresponding document D or D' which, in some illustrative embodiments, includes a computed word distribution of the document, a computed word count of the document, and a timestamp associated with the document. In some illustrative embodiments, the tuple provides a representation of the document that can be processed by a DHP based clustering algorithm, that is modified in accordance with the illustrative embodiments, for distributed execution. The tuple is used for Monte Carlo Sampling operations of the distributed DHP algorithm and document clustering based on similarities between document features. The timestamp may be the document creation date, the word distribution may be based on a baseline vocabulary with counts for each word that appears in the document, and the word count may be the total number of words present in the document.

If the document's topic is not already mapped to a cluster, then a new cluster is generated for that document's topic. If the document's topic is already mapped to a cluster, then that cluster identifier is associated with the document. The pre-processing engine 122 performs such operations and returns the distributed clustering data structure, e.g., docRDD, having the document IDs and their corresponding mappings to the tuple data structures representing those documents, the mapping of documents to cluster identifiers, the mapping of topics of documents to cluster identifiers, and the total number of clusters generated.

An example pseudocode for an algorithm that may be executed by the pre-processing engine 122 is shown in FIG. 3A. As shown in FIG. 3A, a first portion 310 of the algorithm initializes the algorithm and then a second portion 312 computes the tuple representation of the given document in D or D' (while the algorithm shown in FIG. 3A references document D, it is noted that this pre-processing is also applied to new documents D' received in streaming data as well) and inserts that tuple in association with the document identifier into the distributed dataset data structure, e.g., RDD, for the documents (docRDD). A third portion 314 determines whether the document's topic (entity) is already associated with a cluster identifier of a cluster in the existing clusters or not, i.e., the topic is one of the topics in the cluster profile, i.e., matches a cluster label in the cluster profile, corresponding to the cluster identifier, and if not, creating a new cluster identifier and mapping the new cluster identifier to the document and associating the topic with the cluster profile of the new cluster identifier. If the topic is one of the topics in the cluster profile, the existing cluster identifier is mapped to the document identifier. It should be appreciated that initially for the documents D, the topics and cluster labels for corresponding clusters are the same, but as the clusters are updated through the cluster updating operations, the topics associated with the clusters become more distinct from the original cluster labels associated with the corresponding cluster identifier, as the topics associated with a cluster (also referred to as cluster labels) are computed by the clustering algorithm and not derived directly from the topic labels. As an example, consider that in a COVID19 knowledge graph, at some point there may be a cluster which corresponds to a vaccine mRNA-1273. Later, tweets about this vaccine would have started referring to it as the Moderna® vaccine and thus, there are now two cluster labels for the same topic.

A fourth portion 316 returns the distributed dataset data structure (docRDD), and the mappings of document identifier to cluster identifier (doc2clsID) and the topic to cluster identifier (topic2clsID), as well as the total number of clusters generated (cls_no).

The results generated by the pre-processing engine 122 are provided to the cluster initialization engine 124 which operates on the results of the pre-processing of the documents D or D' and initializes a cluster representation of the documents D or D' in a distributed manner. In some illustrative embodiments, the initialization of the cluster representation comprises, for each cluster created as part of the pre-processing, e.g., cluster identifiers 1 to cls_no, initializing the clusters with regard to cluster attributes including word distribution, word count, and timestamp, and then for each partition in the distributed dataset data structure, a partition being a portion of the dataset comprising one or more documents, and for each document in that partition, using the tuple for the document to set values of the document's clusters' attributes. The clusters are then sorted by one or more of the cluster attributes, e.g., timestamp or the like.

The result of processing the initial set of documents D via the pre-processing engine 122 and the cluster initialization engine 124 is an initial set of cluster labels for each document in D which are then able to be the baseline for cluster updates when new documents D' are received as part of the streaming data. The clusters may have multiple documents associated with those clusters and may have one or more topics of those documents associated with the cluster. Thus, the clusters may be mapped to entities in the given knowledge graph such that if new documents are mapped to those clusters, and these new documents have their own topics (entities) associated with them, these topics and entities may likewise be mapped to nodes in the knowledge graph data structure to thereby update the knowledge graph data structure. This updating of the clusters may involve merging and splitting clusters where appropriate as determined through the application of merge/split computer executable rules, trained machine learning or artificial intelligence computer models trained to perform such merging/splitting determinations and operations, or the like.

It should be appreciated that when the new documents D' are received via streaming data, the new documents D' may also be pre-processed and cluster initialization may be performed via the pre-processing engine 122 and cluster initialization engine 124, to obtain an initial set of cluster labels and cluster identifiers for the new documents D'. This initial set of cluster labels may be provided to the cluster update engine 126 or otherwise operated on by the cluster update engine 126 so as to update the baseline set of clusters and then update the knowledge graph corresponding to the updated clusters. The updated baseline set of clusters and the updated knowledge graph may then serve as new baselines for a next iteration of the processing on another new set of documents received via the streaming data, e.g., new set of documents D".

FIG. 3B is an example diagram of one example pseudo-code of a cluster initialization algorithm which may be executed by the cluster initialization engine 124 in accordance with one illustrative embodiment. As shown in FIG. 3B, a first portion 320 of the algorithm initializes a particle object p and its attributes. In the example pseudocode of FIG. 3B, the "particle" object p refers to a dynamic statistical sample that is used by the clustering algorithm, e.g., DHP, to perform a sampling operation, such as a sequential Monte Carlo sampling. The "partition" is a portion of the distributed system that resides on a single physical computing machine, such that an algorithm can be run on different partitions in parallel. In an example illustrative embodiment in which a distributed DHP algorithm is used to perform clustering, the DHP algorithm's sequential Monte Carlo sampling algorithm is invoked in the "sample_cluster_label" in the example cluster update algorithm shown in FIG. 3C as described hereafter, which requires an alpha parameter of DHP to be estimated beforehand using the timestamps in the clusters.

In the example algorithm of FIG. 3B, the attributes of the particle p are the particle's clusters and the particle's cluster times are initialized/updated and will be used in the "sample_cluster_label" subroutine in the algorithm of FIG. 3C as described hereafter, which again will invoke the clustering algorithm, such as DHP, which takes the particle object as input and thus, the particle attributes p.clusters and p.cluster_times are updated by the algorithm shown in FIG. 3B, so that the sampling in the clustering operation, e.g., DHP algorithm's sequential Monte Carlo sampling, is performed correctly.

With reference again to FIG. 3B, having initialized/updated the particle p's attributes, for each cluster from 1 to the total number of clusters (cls_no), in a second portion 322 of the algorithm, the cluster attributes for each cluster are initialized with regard to that particle, and thus, the particle has a set of clusters 1 to cls_no that are initialized. Thereafter, in portion 324, for each partition P in the distributed dataset data structure, e.g., docRDD, for each document D the document's tuple is used to update the cluster attributes. Again, partitions can be processed in parallel as noted above. After having updated the cluster attributes based on the documents associated with those clusters in portion 324, the algorithm, in portion 326, for each cluster in the particle's clusters, sorts the clusters according to the updated cluster_times, and sets the alpha attribute for the clusters to an estimated alpha. It should be appreciated that the p.cluster_times attribute is a map from the cluster ID to a sorted list of timestamps of all documents in that cluster in particle p. The alpha parameter, assuming a clustering algorithm implementing a distributed DHP algorithm, is estimated using this data structure. This alpha parameter will subsequently be used by the DHP algorithm to sample cluster labels for incoming documents in a sequential Monte Carlo Sampling procedure.

FIG. 3C is an example diagram of pseudocode for a cluster update algorithm that may be executed by the cluster update engine 126, such as in response to receiving a set of new documents D' via streaming data, also referred to in FIG. 3C as the set of new documents D2 in the algorithm. The cluster update engine 126 operates on the new documents D' (or D2) by first pre-processing the new documents D' (or D2) via the pre-processing engine 122, and in some illustrative embodiments, the algorithm depicted in FIG. 3A (see portion 330 in FIG. 3C). The cluster update engine 126 then determines for each new document in a partition P, of the distributed dataset data structure for the new documents D', the document's tuples and the cluster identifier for that document if any, such as in portion 332 of the algorithm shown in FIG. 3C. The cluster update engine 126 further determines whether that document requires a new cluster or is to be assigned to an existing cluster. If the document requires a new cluster, then a sequential processing of the new set of documents D' is required and is performed using a clustering algorithm, such as DHP or the like (see portion 334 in FIG. 3C). If a new cluster is not required by the document, then the clusters are updated with the attributes of the document using the document tuple (see portion 336 in FIG. 3C). This is done for each document in each partition P, where again each partition P can be processed in parallel and in a distributed manner. Thereafter, the clusters are sorted, alpha attributes are generated, and the like, similar to the algorithm in FIG. 3B. Finally, the distributed dataset data structure for the new documents D' is merged with the original distributed dataset data structure of the original document dataset D to generate the new baseline document dataset D for subsequent iterations.

It should be appreciated that in the above description of the operations of the pre-processing engine 122, the cluster initialization engine 124, and the cluster update engine 126, and the example algorithms shown in FIGS. 3A-3C, distributed processing of the dataset is facilitated through the distributed dataset data structures, e.g., docRDD, docRDD2, etc., and the partitioning of these distributed dataset data structures such that each partition P may be processed in a distributed manner on different ones on the slave compute nodes 130-134. In addition, the cluster update engine 126 and its algorithm checks to determine whether the clustering operation requires sequential processing or can be distributed prior to performing the clustering operation and thus, can switch between distributed and sequential clustering for new document datasets that are received based on whether or not those new document datasets include new topics or entities requiring their own new clusters.

In addition to the clustering of the initial set of documents D 147, corresponding to a given knowledge graph data structure 145, from a source computing system 140, and then updating of those clusters based on the receipt of new documents D' via streaming data from one or more source computing systems 150-154, the entity re-resolution system 120 further comprises a re-resolution engine 128 that operates on the clusters to perform entity re-resolution by merging/splitting clusters where appropriate and correlating the resulting final set of clusters with the current knowledge graph data structure, which initially is the given knowledge graph data structure 145 but which may be an updated knowledge graph data structure in later iterations.

The entity re-resolution of the dynamic clustering operation performed by the re-resolution engine 128 operates to merge and/or split clusters based on an analysis of the clusters such that entities (or topics) that only occur in the same cluster are merged and only a single topic remains. The re-resolution engine 128 also operates to split a cluster when it is determined that an entity or topic is substantially evenly distributed between two clusters. It should be appreciated that "substantially evenly" distributed refers to a situation in which approximately the same number of instances of documents associated with that entity or topic are present in the two clusters, where there is a predetermined tolerance of difference in number of instances yet the distribution may still be considered "substantially evenly" distributed, e.g., a tolerance of a difference of 5 or less document instances. The tolerance in difference is implementation specific and may vary based on the desired implementation.

In some illustrative embodiments, the re-resolution engine 128 implements a rules-based engine that executes computer executed rules that process the clusters by analyzing the clusters individually and across the plurality of clusters to determine whether particular clusters should be merged and/or split based on specified criteria. As noted above, one such computer executed rule for merging clusters may be to analyze the clusters and determine if a cluster corresponds to multiple entities (or topics) and those entities (or topics) are only present in that one cluster. If such a condition is present, the computer executed rules may further determine whether the characteristics of that cluster warrant a merging of the entities (or topics) into a selected one of those entities (or topics).

Figure 4:
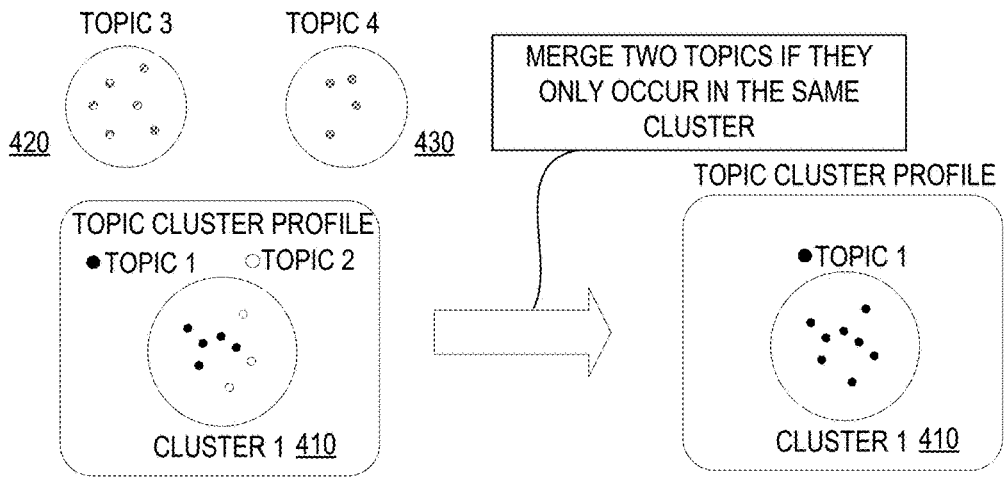
FIG. 4 is an example of a merging operation for merging topics (or entities) of a cluster in accordance with one illustrative embodiment.

An example of merging topics (or entities) of a cluster is shown in FIG. 4. In FIG. 4, and subsequent similar figures, the dots within the cluster represent documents in a document dataset and the shading of those dots represent a topic with which the document is associated (it is assumed for simplicity that each document is associated with a single topic of interest, however this is not a limitation of the present invention and documents may in fact have multiple topics associated with them). As shown in FIG. 4, a cluster 410 comprises a plurality of documents having either a topic corresponding to topic 1 or a topic corresponding to topic 2, where topic 1 and topic 2 are similar topics, such as "COVID19" and "SARS". The documents have been clustered into cluster 410 using a distributed clustering operation such as a distributed DHP operation as previously described above, based on their tuples which are in turn based on the textual content associated with these documents. As a result, cluster 410 has multiple topics, e.g., topic 1 and topic 2.

It is further assumed for purposes of the example depicted in FIG. 4, that other clusters 420 and 430 do not include topic 1 or topic 2 and thus, these topics are only present in a single cluster, i.e., cluster 410. Applying a computer executed rule on the clusters 410-430, it is determined through analysis of the topics associated with the various clusters 410-430, that topics 1 and 2 only are present in cluster 410. Hence, these topics are able to be merged such that the cluster 410 has a single cluster topic, e.g., topic 1. Which topic to select as the cluster topic may be implementation specific, with the selected topic thereafter being applied to all documents present in the cluster 410. For example, in a simpler implementation, the topic that is associated with the majority of documents in the cluster may be selected as the prevailing topic such that all documents in the cluster 410 are thereafter associated with the selected topic and this selected topic is regarded as the cluster topic, e.g., topic 1 in this case. In other illustrative embodiments, a more complex analysis of the clustering of the documents may be performed to identify whether one of the topics is more associated with outlier documents in the cluster 410 than the other topics and if so, then the outlier topics may be discarded and the prevailing topic may be the one that is most associated with the centralized clustering of the documents in the cluster 410. Various selection criteria and analysis may be encoded in the computer executed rules/logic and used to select between topics associated with a cluster such that a single cluster topic is selected and associated with each of the documents in the cluster.

In another example, the re-resolution engine 128 may implement computer executed rules/logic that analyze the clusters and determine if a particular topic is present in multiple clusters and if so, determine the distribution of that topic across the multiple clusters and whether that distribution warrants a splitting of the topic into two or more topics. In splitting the topic between clusters, outliers, or a smallest sub-cluster of the cluster that is being split, may be selected to generate a new cluster and a corresponding second topic.

Figure 5:
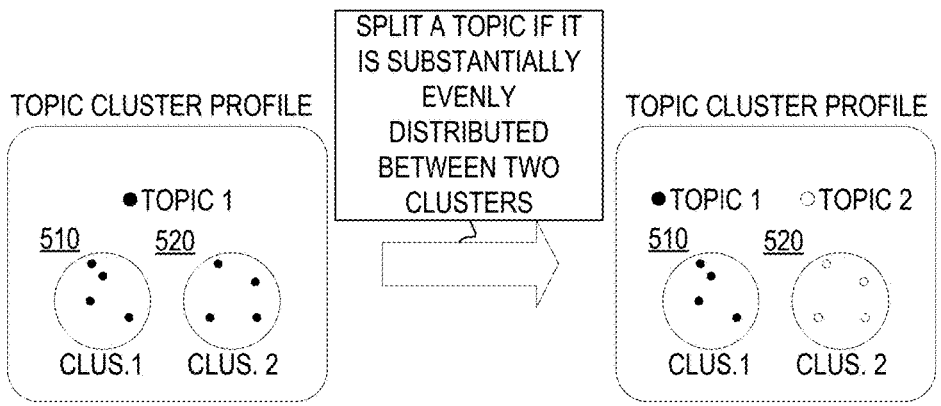
FIG. 5 is an example of a topic splitting operation in accordance with one illustrative embodiment.

An example of this splitting operation is shown in FIG. 5. As shown in FIG. 5, clusters 510 and 520 both have documents present in them that correspond to topic 1. The distribution of documents associated with topic 1 across the clusters 510 and 520 is determined and the distribution is analyzed to determine if splitting criteria are met by the distribution. For example, if the number of documents associated with topic 1 are substantially evenly distributed between clusters 510 and 520, then a splitting of topic 1 into two topics may be performed. Thus, in the case shown in FIG. 5, cluster 510 has 4 documents associated with topic 1 and cluster 520 has 4 documents associated with topic 1 such that the distribution is substantially evenly distributed amongst these clusters 510 and 520. Hence, cluster 510 is associated with topic 1 and cluster 520 is associated with topic 2 through a splitting of topic 1. The topic 2 may be specified according to an entity name that is common to all documents in the cluster but which is distinct from other names of other topics in the original cluster profile. In some illustrative embodiments, the mechanisms of the illustrative embodiments may perform such topic 2 identification and specification automatically by analyzing the original cluster profile, using metadata of the documents being split out, ontologies of concepts specified in the documents, or other knowledge bases for concepts specified in the documents being split, to select a topic name that is not present in the original cluster profile but that is representative of the concepts of the documents being split out. In other illustrative embodiments, the illustrative embodiments may suggest to a data steward or other authorized personnel that the cluster be split and what documents are to be split out into the new cluster, such that the data steward may determine and assign the topic 2 cluster label for the new cluster.

Figure 6:
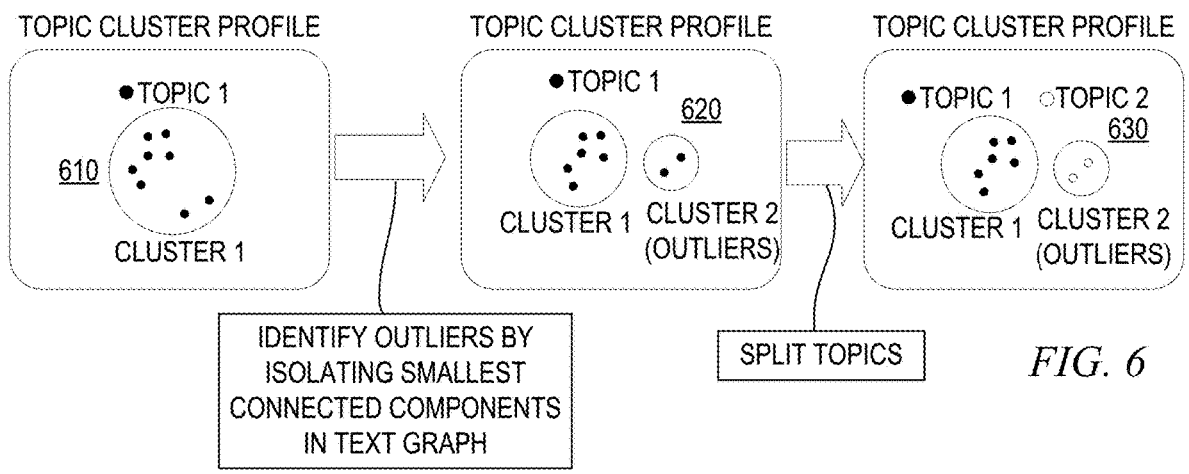
FIG. 6 illustrates another splitting operation that may be performed by the re-resolution engine in accordance with one illustrative embodiment.

FIG. 6 illustrates another splitting operation that may be performed by the re-resolution engine 128. As shown in FIG. 6, the cluster 610 is associated with topic 1, but the distribution of documents within the cluster 610 shows that there are some outlier documents 620 that may serve as a possible separate cluster. By applying appropriate computer executed rules to the distribution of documents relative to one another within the cluster 610, the outlier documents 620 may be identified, such as by identifying the smallest connected components in the cluster 610. From the outlier documents, a second cluster 630 may be generated and a corresponding topic, topic 2 may be associated with the documents of the second cluster 630.

It should be appreciated that while a computer executed rules-based engine is provided as one example implementation of the illustrative embodiments, other illustrative embodiments may utilize other artificial intelligence computer mechanisms for executing the improved computer functionality of the illustrative embodiments. For example, in other illustrative embodiments, one or more trained neural network computer models may be configured to perform the analysis of the clusters and determine when to merge/split clusters and how to merge/split clusters, so as to achieve a similar improved computer functionality as the computer executable rules-based engine. These one or more trained neural network computer models may be neural network computer models that are trained through machine learning processes on training data having given clusters of entities (or topics) with associated ground truth results to train the operational parameters of the neural network computer models to reduce error and generate correct results as to when to merge/split clusters and how to merge/split clusters. In addition, it should be appreciated that other types of computer models may likewise be configured to perform the improved computer functionality of the illustrative embodiments, including convolutional neural networks (CNNs), deep neural networks (DNNs), long short-term memory (LSTM), graph neural networks (GNNs), and the like. Any suitable machine learning trained or specifically configured computer model that is specifically configured to perform the improved computer functionality of the illustrative embodiments may be implemented in the illustrative embodiments without departing from the spirit and scope of the present invention.

Thus, returning to the depiction in FIG. 1, assuming that the above described operation for initializing the clustering mechanisms of the illustrative embodiments have been performed based on the given knowledge graph data structure, its corresponding initial set of documents D, such that a baseline set of clusters are generated for the given knowledge graph data structure and set of documents D, streaming data may be obtained from source computing systems 150-154 that comprise new documents D'. These new documents D' may be portions of unstructured data streamed to the master compute note 110 from the source computing systems 150-154, such as through a social networking computer system, such as Twitter®, Instagram®, Facebook®, a news feed, or the like, or through another data streaming service. The documents D', which may be any portion of unstructured textual data, may have associated metadata specifying entities or topics, and/or textual content of the unstructured data may be processed to perform entity recognition and extract entities and their relationships from the metadata and textual data content over a given period of time. These entities and relationships may be input to the entity re-resolution system 120 of the master compute node 110 which performs pre-processing, cluster initialization, and cluster updating taking into consideration the temporal characteristics associated with the entities (topics) and relationship mentions in the metadata/textual content of the streaming data.

For example, in some illustrative embodiments, a distributed Dirichlet Hawkes Process (DHP) may be employed to cluster the entities into a plurality of clusters, where the DHP algorithm operates on distributed dataset data structures and is modified in accordance with the illustrative embodiments to operate in a distributed manner when no new clusters are required, but to operate in a sequential manner when new clusters are determined to be required by the documents being processed in the partitions of the distributed dataset. When executing in a distributed manner, the slave compute nodes 130-134 may process partitions P of the distributed dataset given to them by the master compute node 110 so as to perform cluster updating operations. Each cluster may be associated with a corresponding entity (or topic) and these entities or topics may be submitted to entity matching logic that uses the entities in the original knowledge graph to attempt to match the entities of the streaming data with these entities in the original knowledge graph. Based on the entity matching logic, clusters of entities (or topics) from the streaming data may be generated and then the merge/split computer model(s) are executed on the clusters to determine a final set of clusters and their corresponding entities (or topics).

This process may be performed in a dynamic and distributed manner across multiple computing devices as streaming data is being received by those computing devices. In this way, entity (or topic) re-resolution is performed in a dynamic and distributed manner and the nodes corresponding to the re-resolved entities (or topics) may be updated in the corresponding knowledge graph. The resulting dynamically updated knowledge graph may be provided to downstream computing systems which operate on such knowledge graphs to perform their operations, such as various types of cognitive computing systems comprising computer executed natural language processing, machine learning computer model processing, GNNs, and the like. As the knowledge graph entities are re-resolved in a dynamic manner, the knowledge graph is more accurate than the static knowledge graphs and provides improved accuracy of results generated by these downstream computing systems.

In addition, the illustrative embodiments provide mechanisms for providing a visualization output for explaining the re-resolution of similar entities (or topics) in the knowledge graph and streaming data. That is, the dynamically updated heterogeneous (nodes of different types of entities or topics) knowledge graph may be provided as input to a visualization engine 129 which may implement a graph neural network (GNN) which generates GNN embeddings providing the characteristics for each node in the graph of that node's neighborhood of connected nodes within the knowledge graph, where the neighborhood may be defined by a specified number of nodes, edges, or "hops" from the given node. By projecting the GNN embeddings of nodes after re-resolution, the mechanisms of the illustrative embodiments are able to show the proximity of re-resolved entities which may be closer in update times, even if they are distant in terms of concept.

FIG. 7 is an example diagram of a visualization output that may be generated by the visualization engine 129 based on the GNN embeddings generated by the visualization engine 129 on the updated knowledge graph. As shown in FIG. 7, node embeddings are projected where the node embeddings incorporate the timestamp such that the proximity of two nodes is a function of both the semantic closeness and also the closeness in time. The visualization of the node embeddings may assist a data steward in understanding the updates made to the knowledge graph data structure so that the data steward can decide to accept an update or reject the update based on this visualization.

For this depicted example, it is assumed that each input document is a sentence in unstructured data or a row of cells in structured data. After pre-processing the input in the manner previously described above, which includes removing stop-words (words like "the", "an", "of" which are too common in the English language) among other things, each input consists of entities (which are one or a few words) representing entities or topics in the real world (examples include a person's name, date of birth, an organizations address).

Compared to the visualization of word embeddings in lower dimensions that have been present in prior art, the visualization engine 129 projects the time sensitive GNN embeddings of the entities in the knowledge graph. Each entity $e_i$ is represented as e<i, t> where i denotes the entity instance and t can take the timestamp values at which the entity was first observed or updated. Entity $e_i$'s relationship to $e_j$ is represented as <$e_i$, $e_j$, $r_k$, t> where $r_k$ is the relationship type, if any, and t is the timestamp at which the relationship was observed or updated. Each entity or relationship may have a time to live since the last update, after which the entity or relationship is removed from the knowledge graph. With these changes to incorporate time in place, the process to generate GNN embeddings can be used to generate time sensitive embeddings as well.

Each entity in the input is assigned a multi-dimensional, e.g., 512-dimensional, vector that is trained by a Graph Neural Network (GNN) model (known as a GNN embedding of the entity). This embedding is a vector that encodes the attributes of the entity, other entities linked to this entity, and a time component. To add the time component to the vectors of each of the entities, the time component is concatenated at the end and the original vector is padded to the dimension required. The exact length of the time component in the vector is an hyperparameter given during model training. The vectors are then projected to two (2D) or three dimensions (3D) first by dimensionality reduction using t-SNE (t-distributed stochastic neighbor embedding).

The projection generated by the visualization engine 129 may be provided to a data steward or other authorized user as a visual representation of the reasoning for the updated knowledge graph. For example, consider the viruses which were initially named after the place where they were first observed and were later assigned an official name by the World Health Organization (WHO) or were known by other names. "Wuhan Virus" or "Spanish Flu" are two such entities (topics) which have been re-resolved, by operation of the illustrative embodiments, as "SARS-Cov2" and "Flu of 1918". "Ebola Virus" is a counter example which did not get re-resolved over time. If the elements/topics "Wuhan Virus" and "SARS-Cov2" are projected without time attributes, they will be relatively far apart because "Wuhan" appears in the news in a lot of other contexts as well as the context of "SARS-Cov2". However, because the illustrative embodiments, in performing the clustering and re-resolution of entities uses time as an additional attribute, at some point during the re-resolution of the knowledge graph, "Wuhan Virus" and "SARS-Cov2" would appear closer in the visualization. In addition, many other related nodes (topics), such as coronavirus, epidemic, etc. will give additional context to the data steward as to why the "Wuhan Virus" entity/topic was re-resolved as "SARS-Cov2".

Thus, the illustrative embodiments provide an improved computing tool and improved computing tool operations for performing automatic and dynamic entity (topic) re-resolution based on streaming data, and specifically unstructured streaming data, so that a knowledge graph data structure representing the entities and their relationships are maintained timely and up-to-date. The resulting updated knowledge graph data structure(s) may be provided as input to downstream computing systems for performing various artificial intelligence operations. For example, patterns of re-resolution may be analyzed by downstream artificial intelligence operations based on maintaining a history of re-resolution to identify fraud. As an example, if an entity, e.g., a person entity, is repeatedly being re-resolved over time, this may indicate a fraud pattern where the person is assuming multiple identities. If re-resolution of an entity leads to two entities being labeled the same real-world person or organization, an alert may be generated for human verification. Other types of downstream computing systems and artificial intelligence may perform other complex decision support and AI operations based on updates to entities in a knowledge graph through entity re-resolution.

FIG. 3D is an example diagram of pseudocode of an entity re-resolution algorithm that may be executed by the entity re-resolution engine in accordance with one illustrative embodiment. The algorithm shown in FIG. 3D involves the execution of the pre-processing engine, cluster initialization engine, and cluster update engine and their corresponding algorithms. It should be appreciated that the results generated through the algorithm shown in FIG. 3D may be provided to a visualization engine to generate the visualization output noted above, e.g., as shown in FIG. 7, as well as provide the updated knowledge graph corresponding to the updated clusters and their topics to downstream computing systems for further processing.

As shown in FIG. 3D, the overall algorithm of the entity re-resolution engine receives an initial set of documents D with topic labels and a set of new documents D' as updates to D with topic labels where a topic denotes an entity. The process includes the pre-processing of each document in D to obtain a series of tuples, e.g., timestamp, word distribution, word count, as document features, and initializes the distributed clustering operation, e.g., distributed DHP, to the clustering of the initial set of documents induced by the topic labels and the parameters corresponding to the observed cluster feature distribution (set of document features in each cluster). Document features, e.g., similar tuples, are obtained for the new documents D' and cluster labels for each of these documents D' are generated using the previously initialized distributed clustering operation, e.g., distributed DHP. The topic labels of the union of D and D' are mapped to the cluster labels and entities of the union of D and D' are re-resolved, e.g., merging/splitting of topics, according to the cluster profiles. The initial set of documents D is then set to the union of D and D' and the operation is repeated for the next set of incoming documents D'. This algorithm is also reflected in the flowchart of FIG. 8 hereafter.

FIG. 8 is an example diagram illustrating an overall operation of an entity re-resolution engine in accordance with one illustrative embodiment. As shown in FIG. 8, the overall improved computer tool operations for performing the entity re-resolution using streaming data assumes an initial set of documents D with topic labels and a previously existing knowledge graph data structure 810 having nodes and edges representing entities (or topics) and their corresponding relationships, e.g., one topic or entity is related to another topic or entity. A new set of documents D' 820 are received as updates to the initial set of documents D, such as via a streaming of unstructured data over time. As shown in FIG. 8, the new set of documents D' 820 comprise documents specifying entities (or topics), and relationships, with the documents being received over time as a streaming of data. The new set of documents D' 820 are processed via the pre-processing engine and cluster updating engine which together perform a distributed clustering of the new set of documents D' 820, such as by using a distributed clustering operation 825, such as a distributed Dirichlet Hawkes Process (DHP) algorithm or the like, to generate a clustering 830 of the entities/topics relative to the baseline clusters corresponding to the given knowledge graph 810 and initial set of documents D. Entity matching 840 is performed on the entities in the new set of documents D' 820 to match those entities with entities in the various clusters 830 and correlate those entities with entities of the knowledge graph 810, as shown as element 840 in FIG. 8. For example, as shown in FIG. 8, node 3 (corresponding to entity 3) matches node 2 (corresponding to entity 2), node 7 is a new node corresponding to a new entity, and node 4 is one that is to be split based on clustering and entity matching. The entity re-resolution engine 850 processes the results of the entity matching with regard to the clusters 830 and merges/splits entities/topics where appropriate, such that a re-resolved clustering is generated and used to update the knowledge graph to be an updated knowledge graph 860. As shown in FIG. 8, the updated knowledge graph 860 comprises the merged node 862 which is a merging of nodes 2 and 3, the new node 864, which is node 7, and split nodes 866 and 868, corresponding to a splitting of node 4 into nodes 4a and 4b.

In addition, the visualization engine 870 provides a visualization output of the reasoning for the updating of the knowledge graph, also referred to as an explainability visualization 880, which may be used by the data steward. The explainability visualization 880 may be generated by processing the updated knowledge graph data structure 860 via a GNN or other graph-based artificial intelligence computer model, to generate embeddings that provide information about the neighborhood of nodes corresponding to each node in the knowledge graph. These embeddings may be projected onto the nodes of the knowledge graph to generate a visualization of this information for use by the data steward or other authorized user. Furthermore, the updated knowledge graph data structure 860 may be provided to downstream computing systems 880 as input for their artificial intelligence, decision support, or other operations.

Figure 9:
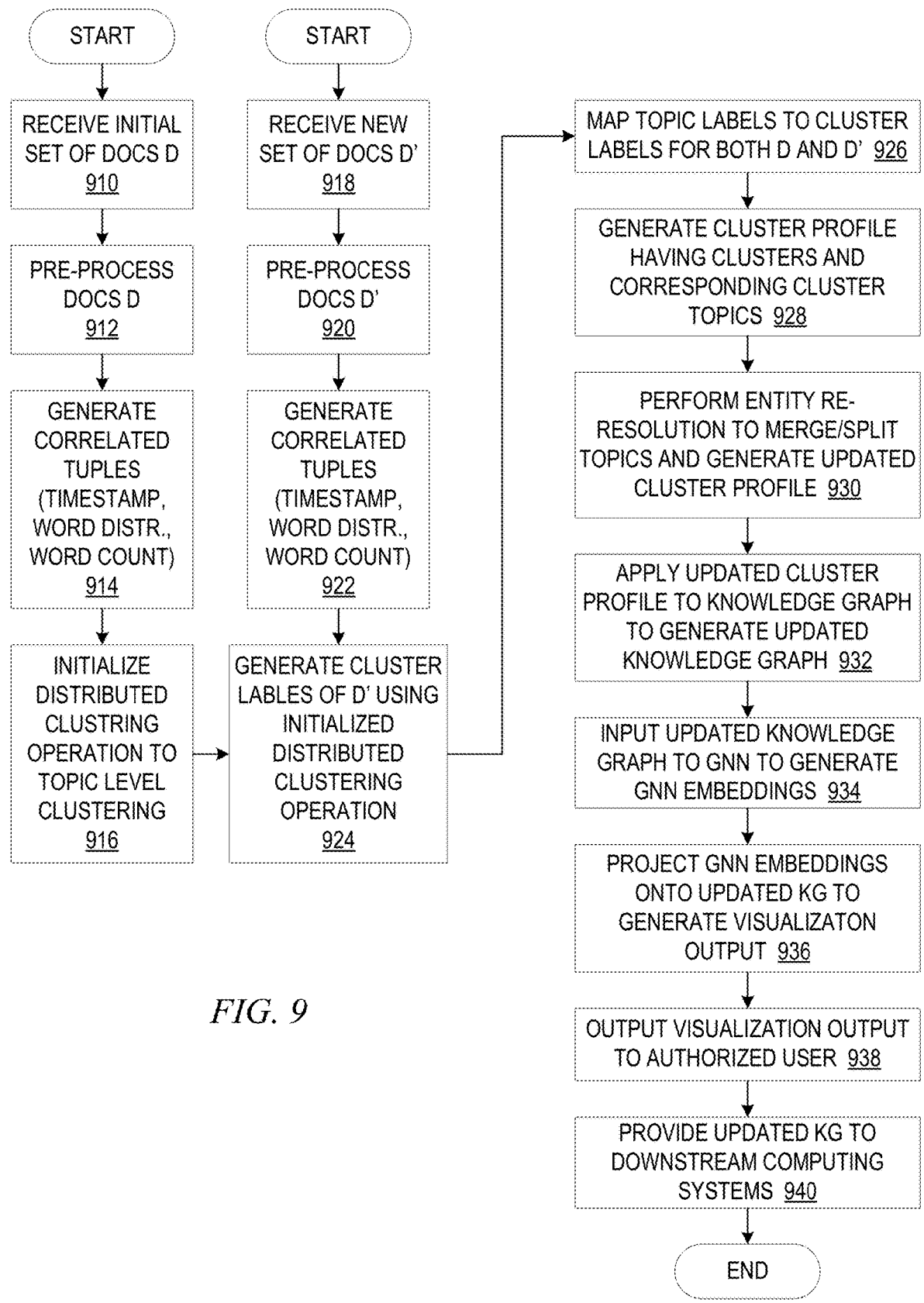
FIG. 9 is a flowchart of an overall process of an entity re-resolution engine in accordance with one illustrative embodiment.

FIG. 9 is a flowchart of an overall process of an entity re-resolution engine in accordance with one illustrative embodiment. As shown in FIG. 9, the operation involves an initial document dataset D and a new document dataset D' being received. It is assumed for ease of explanation, that the initial document dataset D is received (step 910) prior to the new document dataset D' (step 918). The documents in the initial document dataset D are processed via the pre-processing engine and a pre-processing algorithm executed by the pre-processing engine on the documents of this document dataset D (step 912). This pre-processing may involve executing an algorithm such as that shown in FIG. 3A, for example. The pre-processing generates a correlation of documents with tuple representations of those documents (step 914) which are used to initialize a distributed clustering operation, such as a distributed DHP operation, to a topic level clustering (step 916).

In a similar process, the new documents D' are received as part of streaming data (step 918) and are pre-processed in a similar manner (step 920) to generate tuples corresponding to the new documents D' (step 922). Utilizing the initialized distributed clustering operation, cluster labels are generated for the new documents D' (step 924). For example, an algorithm, such as that shown in FIG. 3B may be used by the cluster initialization engine to generate a baseline set of clusters of the documents D and new documents D' using a distributed clustering operation. The topic labels of the documents are mapped to cluster labels for both the initial set of documents D and the new documents D' (step 926) to thereby generate a cluster profile having a plurality of clusters and their associated cluster topics (step 928). Entity re-resolution is then performed on the cluster profile to merge/split topics associated with clusters and thereby modify the clusters of the cluster profile and generate an updated cluster profile (step 930). The updated cluster profile is then applied to the knowledge graph data structure to update the knowledge graph data structure to reflect the updated entity (topic) correlation of the clusters after merging/splitting (step 932). The updated knowledge graph data structure is input to a graph neural network (GNN) which then generates GNN embeddings (934) that are projected onto the knowledge graph to generate a visualization output (step 936). The visualization output is output to an authorized user for use in determining reasoning for the update to the knowledge graph (938) and the updated knowledge graph data structure may be output to downstream computing systems for use as a basis of further artificial intelligence, decision support, or other computing operations (step 940). The operation then terminates.

Figure 10:
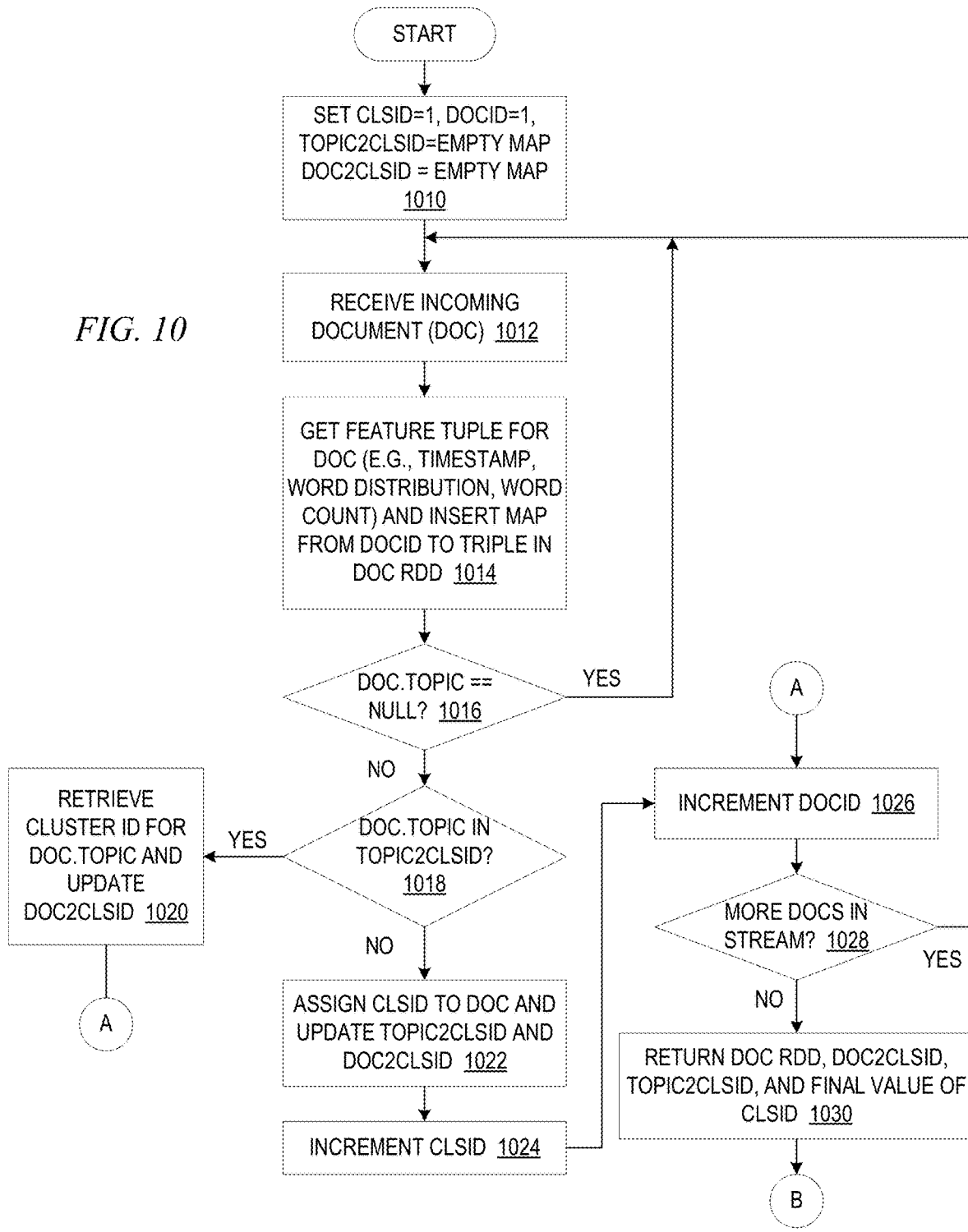
FIG. 10 is a flowchart outlining an example operation for pre-processing a set of documents in accordance with one illustrative embodiment.

FIG. 10 is a flowchart outlining an example operation for pre-processing a set of documents in accordance with one illustrative embodiment. In some illustrative embodiments, the operation shown in FIG. 10 may be similar to the functionality described in algorithm 2 in FIG. 3A, for example. As shown in FIG. 10, the cluster identifier (clsID), document identifier (docID), topic to cluster identifier mapping data structure (topic2clsID), and document to cluster identifier mapping data structure (doc2clsID) are initialized to initial values/contents (step 1010). An incoming document is received (step 1012) and a feature tuple data structure for the document is generated and corresponding mapping entries are generated to map from the document identifier to the triple in a distributed dataset data structure, such as a RDD or the like (RDD will be used as an example herein) (step 1014). In some illustrative embodiments, the feature tuple data structure comprises features of a timestamp, word distribution, and word count, but is not limited to such and other features may be utilized, either in addition to and in combination with these features, in replacement of one or more of these features, or the like.

A determination is made as to whether a topic associated with the document is null, i.e., there is no topic designated for this document in the metadata, by an authorized user, in keywords of a search that resulted in this document being retrieved, or otherwise provided in association with the incoming document (step 1016). In the case that a document topic (doc.topic) is null, the operation returns to step 1012, but keeping in mind that step 1014 is executed, which means that even if the topic level information is missing and no initial cluster can be assigned, the word level information in the document is retained in the system (so that the global vocabulary is updated). Later, these documents with missing topics can be assigned cluster ids using DHP. If the document topic is not null, then a determination is made as to whether the document topic is already in the topic to cluster identifier mapping data structure (topic2clsID) (step 1018). If it is present already in topic2clsID, then the cluster identifier for the document topic is retrieved from the topic2clsID data structure and the document to cluster identifier mapping data structure (doc2clsID) is updated to reflect the mapping of the document identifier to the cluster identifier (step 1020). The operation then continues to step 1026 described hereafter.

Figure 11:
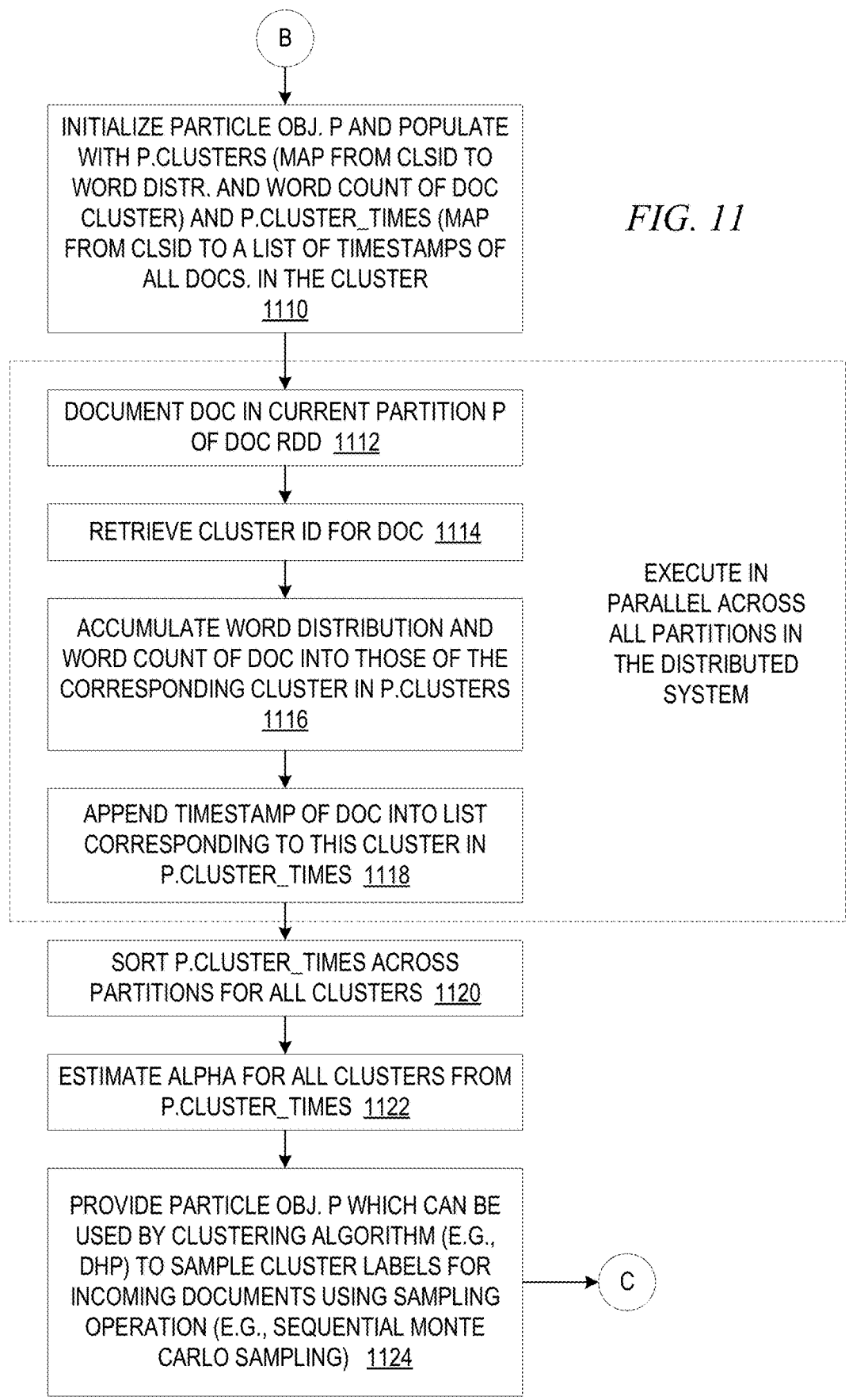
FIG. 11 is a flowchart outlining an example operation for performing cluster initialization in accordance with one illustrative embodiment.

If the document topic is not already present in the topic2clsID mapping data structure, then a cluster identifier is assigned to the document and the topic2clsID (topic of document is mapped to assigned cluster identifier) and doc2clsID mapping data structures (document identifier is mapped to assigned cluster identifier) are updated to reflect this cluster identifier assignment (step 1022). The cluster identifier is then incremented, so that a next cluster identifier assignment will used the incremented cluster identifier (step 1024). Thereafter, or after step 1020, the document identifier (docID) is incremented (step 1026) and a determination is made as to whether there are more documents in the incoming document stream (step 1028). If there are more documents in the document stream, then the operation returns to step 1012. If there are no more documents in the document stream, then the operation returns the document distributed dataset (docRDD), the document to cluster identifier (doc2clsID) mapping data structure, topic to cluster identifier (topic2clsID) mapping data structure, and the final value of the cluster identifier (clsID) (step 1030). The operation then continues to the operation of the cluster initialization (e.g., algorithm 3 in FIG. 3B) as shown in FIG. 11. It should be appreciated that the system takes data input from a stream and the stream usually sends an "End of Stream" indicator when there are no more elements left in the stream. The system listens to the stream input and looks for this indicator. Thus, so long as documents remain in the stream, i.e., the "End of Stream" indicator is not read, the system continues the operation in an infinite loop.

FIG. 11 is a flowchart outlining an example operation for performing cluster initialization in accordance with one illustrative embodiment. In some illustrative embodiments, the operation shown in FIG. 11 may be similar to the functionality described in algorithm 3 in FIG. 3B, for example. As shown in FIG. 11, the operation starts by initializing the particle object P and populates the particle object P with p.clusters, i.e., a map from cluster identifier to word distribution and word count of the document cluster, and p.cluster_times, i.e., a map from cluster identifier to a list of timestamps of all documents in the cluster (step 1110). Thereafter, steps 1112-1118 are performed in parallel across all partitions in the distributed system, which may include execution on a plurality of different compute nodes, which may be computing devices, processors, or the like.

As shown in FIG. 11, a next document (doc) in the current partition P of the document distributed dataset, e.g., docRDD, is selected (step 1112). The cluster identifier for that document (doc) is retrieved from the docRDD (step 1114) and the word distribution and word count of the document is accumulated into those of the other documents corresponding with the cluster, in p.clusters for the particle object P (step 1116). The timestamp of the document (doc) is appended into the list of corresponding timestamps for this cluster in p.cluster_times (step 1118). Again, these steps are executed in parallel across all partitions in the distributed system.

The p.cluster_times mapping data structure is sorted across the partitions for all clusters, i.e. at the global level and not the partition level. A value for the alpha parameter of the clustering operation is then estimated from the p.cluster_times (step 1122). Alpha is a parameter of the clustering algorithm, e.g., the modified distributed DHP of the illustrative embodiments, that is responsible for determining the influence of time on the clustering operation, such that when a new document is received with a new timestamp, the alpha parameter helps in determining the effect of the timestamp on the assigned cluster ID through the sampling operation, such as Sequential Monte Carlo sampling. The alpha parameter estimation uses the set of sorted timestamps as input to perform the estimation.

The particle object P is then provided to the clustering algorithms or logic so that the particle object P can be used to sample cluster labels for incoming documents. The alpha parameter is stored as a part of the particle object, so an update to alpha will also update the particle object. Step 1122 precedes step 1124 because retrieval of the cluster ID is a partition level operation which can be executed in parallel across partitions. Alpha is used as an input to the sampling operation of the clustering as noted above to compute the new cluster label by obtaining a probability distribution over cluster labels and choosing the most probable one. Here the sampling process generates the probabilities of each cluster label depending on whether they are included in the generated sample or not. The operation then proceeds to the process shown in FIG. 12 which performs cluster updating as new documents are received in a document stream. Alternatively, although not shown, the operation may terminate at this point until there is a document stream initiated which has new documents that are to be used to update the clustering.

Figure 12A:
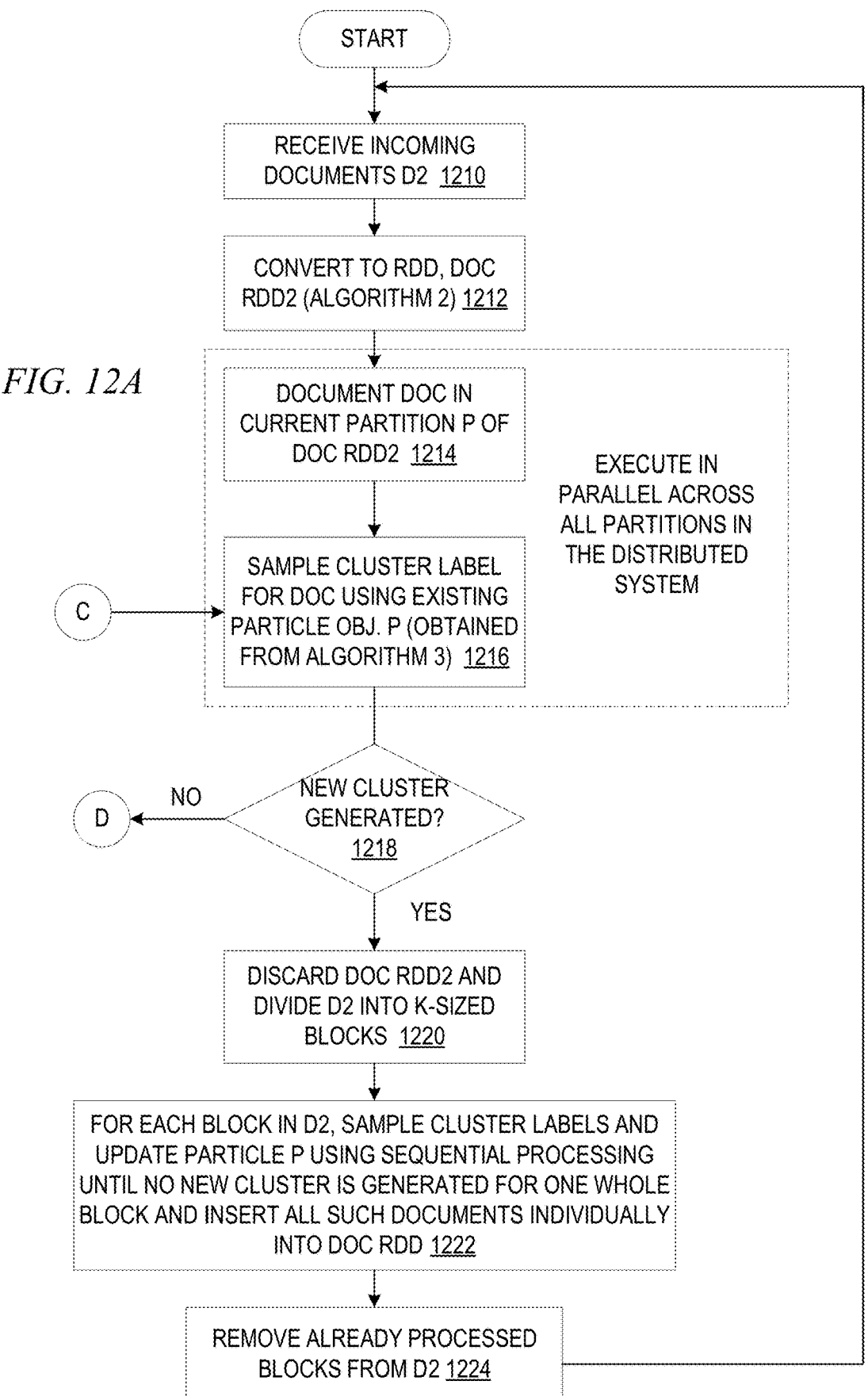
FIGS. 12A and 12B show a flowchart outlining an example operation for performing cluster updates in accordance with one illustrative embodiment.
Figure 12B:
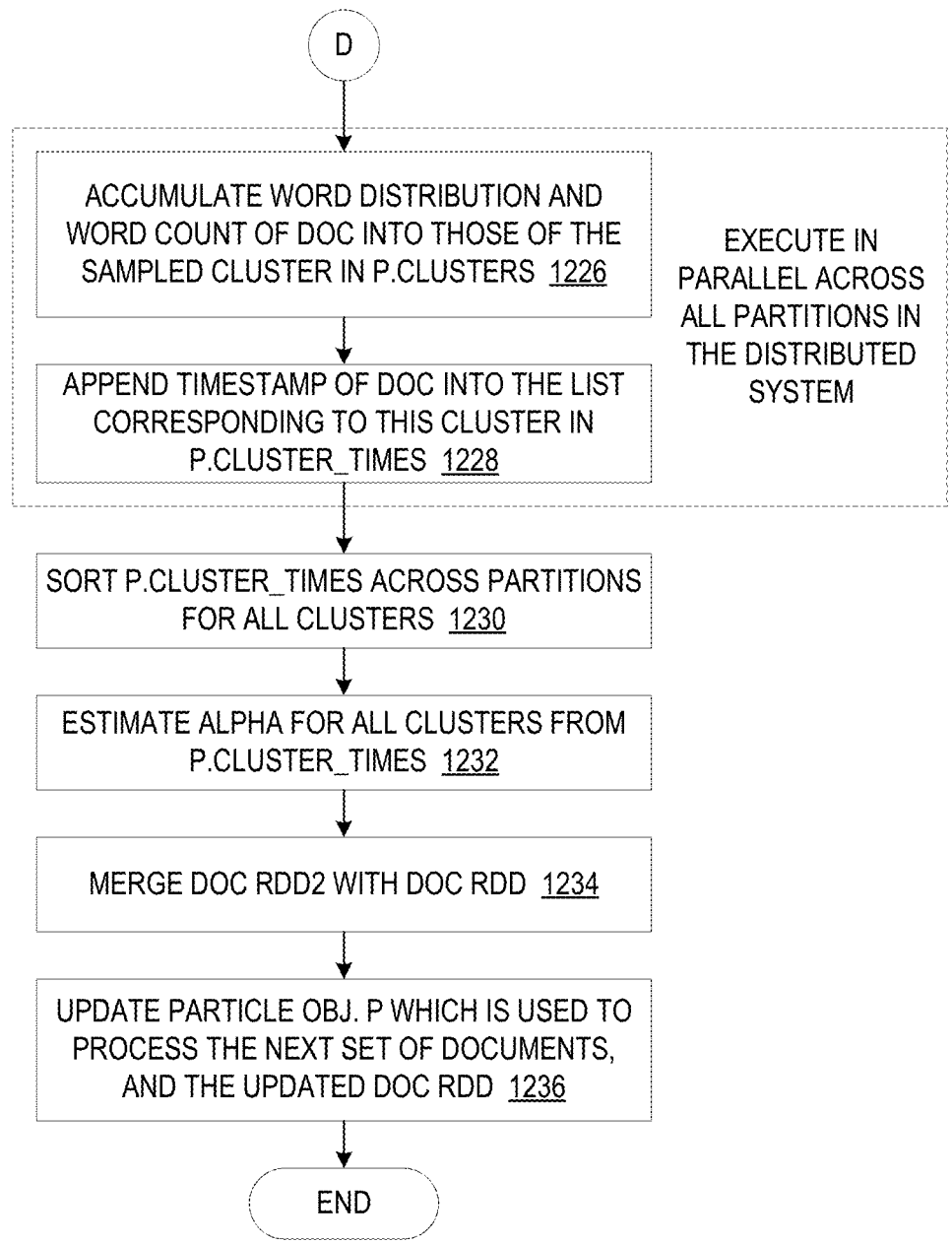

FIGS. 12A and 12B show a flowchart outlining an example operation for performing cluster updates in accordance with one illustrative embodiment. In some illustrative embodiments, the operation shown in FIGS. 12A and 12B may be similar to the functionality described in algorithm 4 in FIG. 3C, for example. As shown in FIG. 12A, the operation starts by receiving incoming documents (new documents) D2, also referred to above as documents D' (step 1210). The new documents are converted to a distributed dataset, e.g., docRDD2, such as by using the pre-processing algorithm 2 in FIG. 3A and/or the operation outlined in FIG. 10 (step 1212). The document (doc) is placed in the current partition P of the document distributed dataset (docRDD2) (step 1214). Then, across all partitions in the distributed system, sampling of cluster labels is executed for the document using exiting particle object P, which may be obtained from the algorithm 3 in FIG. 11, for example (step 1216). That is, this operation is replicated across all partitions and thus, naturally different partitions will operate on different documents since a document is restricted to a single partition.

Thereafter, a determination is made as to whether a new cluster needs to be generated for the document (doc) (step 1218). If not, the operation proceeds to operations shown in FIG. 12B. If a new cluster needs to be generated, then the document distributed dataset (docRDD2) is discarded and the new documents dataset D2 is divided into K-sized blocks, where K is a tunable parameter (step 1220). Thereafter, for each block in D2, cluster labels are sampled and particle P is updated using sequential processing until no new cluster is generated for one whole block, with all such documents being individually inserted into the doc RDD (not docRDD2, but rather the updating of doc RDD) (step 1222). Here, sampling cluster labels refers to choosing from a predicted probability distribution over cluster labels such that the most probable label is selected from the distribution. The insertion procedure converts documents into their tuple format and stores the tuple in the docRDD. The already processed blocks are removed from the dataset D2, and the process returns to step 1210.

FIG. 12B depicts the operation branching from step 1218 in FIG. 12A when it is determined that no new cluster needs to be generated. As shown in FIG. 12B, steps 1226 and 1228 are executed in parallel across all partitions in the distributed system. The word distribution and word count of the document is accumulated into those of the sampled cluster in the p.clusters data structure (step 1226). The timestamp of the document is appended into the list corresponding to this sampled cluster in p.cluster_times (step 1228). Thereafter, the p.cluster_times mapping data structure is sorted across partitions for all clusters (step 1230). The alpha parameter is estimated for all clusters from the p.cluster_times data structure (step 1232) and the docRDD2 is merged with docRDD (step 1234). The particle object P is updated and is then provided as output, along with the updated docRDD, for use in processing the next set of documents (step 1236), with the operation terminating thereafter.

Figure 13:
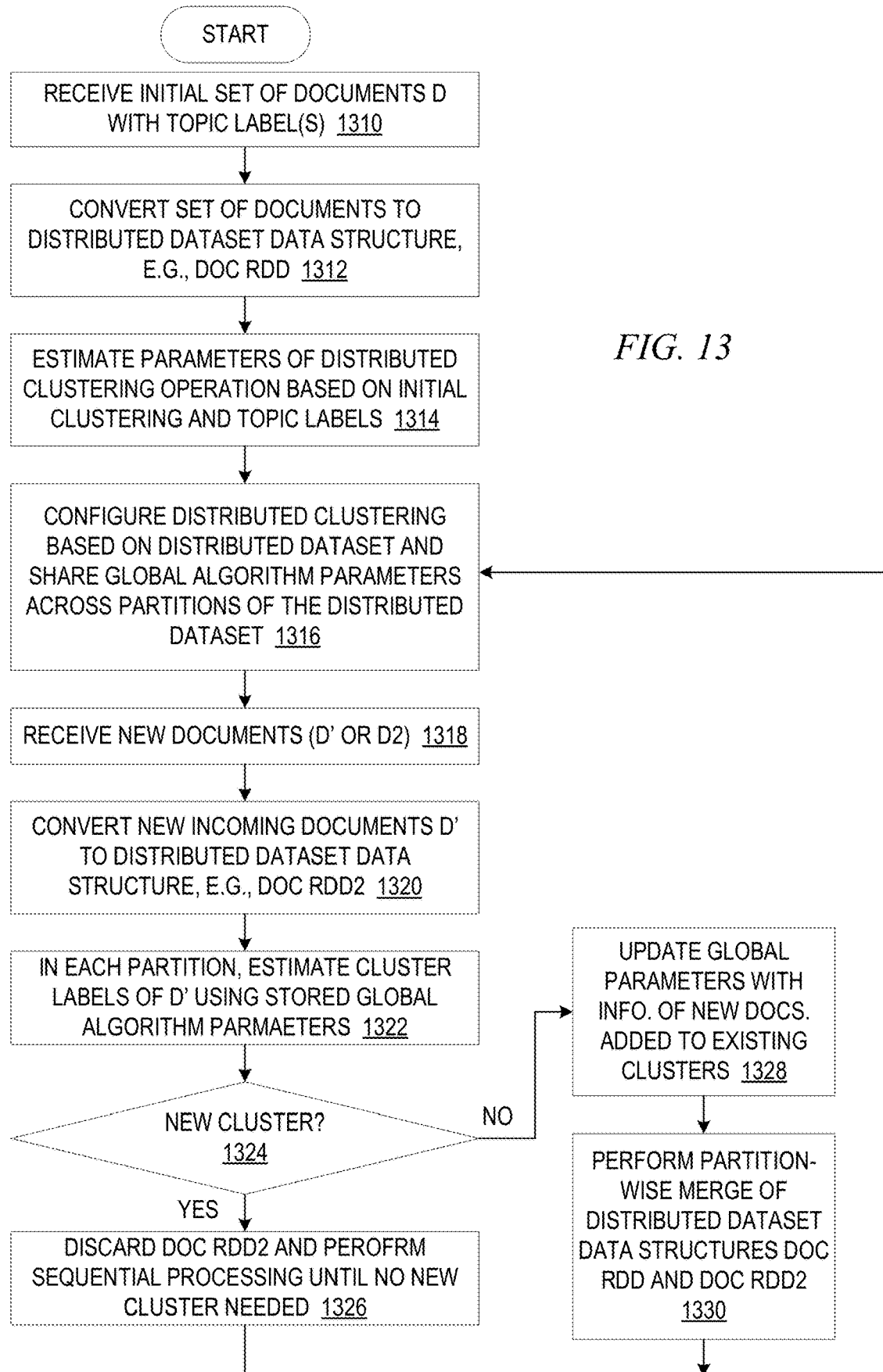
FIG. 13 is a flowchart outlining a procedure for distributed processing of a clustering operation in accordance with one illustrative embodiment.

FIG. 13 is a flowchart outlining a procedure for distributed processing of a clustering operation in accordance with one illustrative embodiment. In some illustrative embodiments, the operation shown in FIG. 13 may be similar to the functionality described in the algorithm of FIG. 3D, for example. As shown in FIG. 13, the initial set of documents D with topic labels are received (step 1310) and converted to a distributed dataset data structure, such as an Apache® Spark™ RDD, docRDD by a preprocessing operation (step 1312). The preprocessing operation converts the documents into a format that is usable by the distributed clustering operation, such as by converting the documents into a tuple representation as discussed above, for example. Based on an initial clustering of the documents D, parameters of the specific distributed clustering operation are estimated according to topic labels (step 1314). These parameters and the distributed dataset data structure, e.g., docRDD, are used to configure the distributed clustering operation and share global algorithm parameters across partitions of the distributed dataset (step 1316).

Assuming new incoming documents D' (or D2) (step 1318), similar to the initial set of documents D, the new incoming documents D', which may be part of streaming data, are converted to a distributed dataset data structure, e.g., docRDD2 (step 1320). In each partition of the distributed clustering mechanism, the cluster labels of D' are estimated using the previously stored global algorithm parameters (step 1322). A determination is made as to whether a new cluster needs to be created (step 1324). If so, the distributed dataset data structure, docRDD2, for the new incoming documents D' is discarded and a sequential processing is performed as in the original clustering algorithm, e.g., DHP (step 1326). If a new cluster does not need to be created, the global algorithm parameters are updated with information of the new documents added to the existing clusters (step 1328). A partition-wise merge of the distributed dataset data structure for the initial documents (docRDD) and the new documents (docRDD2) is performed (step 1330) and the operation returns to step 1316 to wait for additional new incoming documents.

It should be appreciated that the operations outlined in FIGS. 9-13 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 9-13, and may, in some cases, make use of the results generated as a consequence of the operations set forth in FIGS. 9-13, the operations in FIGS. 9-13 themselves are specifically performed by the improved computing tool in an automated manner.

Figure 14:
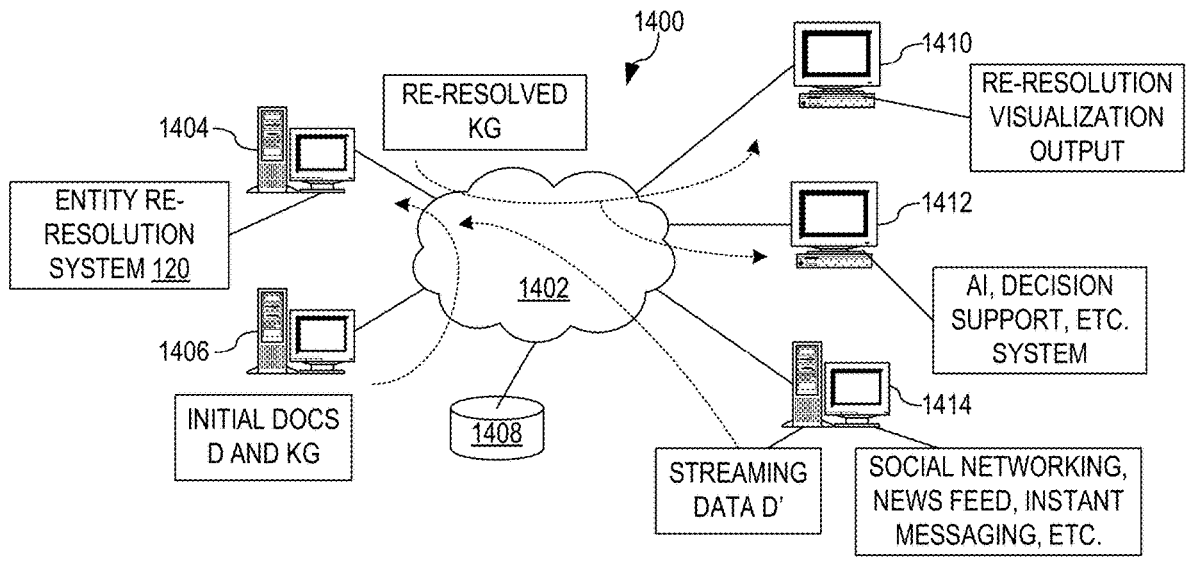
FIG. 14 is an example diagram of a distributed data processing system in which aspects of the illustrative embodiments may be implemented.
Figure 15:
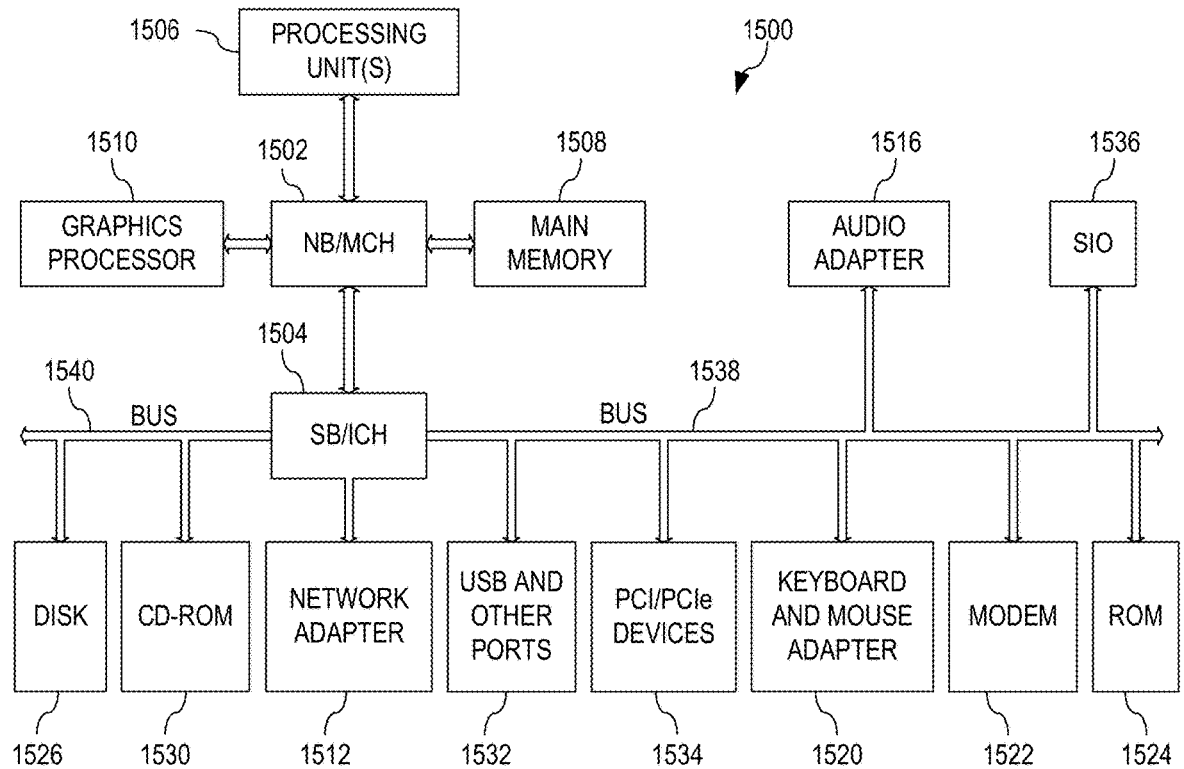
FIG. 15 is an example block diagram of a computing device in which aspects of the illustrative embodiments may be implemented.

In view of the above, it is clear that the present invention provides an improvement to computer functionality and an improved computing tool and improved computing tool operation specifically directed to performing entity re-resolution based on streaming data so as to update knowledge graphs dynamically for use by artificial intelligence, decision support, or other downstream computing systems that rely on up-to-date knowledge representations in knowledge graphs. It is apparent, as an improved computing tool and improved computing tool operation, the illustrative embodiments may be utilized in many different types of data processing environments involving computing devices. FIGS. 14 and 15 are provided hereafter as example environments in which aspects of the illustrative embodiments may be implemented. It should be appreciated that FIGS. 14 and 15 are only examples and are not intended to assert or imply any limitation with regard to the computing environments in which aspects or embodiments of the present invention may be implemented. Many modifications to the depicted computing environments may be made without departing from the spirit and scope of the present invention.

The present invention may be a specifically configured computing system, configured with hardware and/or software that is itself specifically configured to implement the particular mechanisms and functionality described herein above in accordance with one or more of the illustrative embodiments. These hardware and/or software mechanisms are specifically configured to generate a specifically configured computing tool that performs a method, and/or executes a computer program product comprising software logic that is loaded into a computing system to specifically configure the computing system, to implement the mechanisms and functionality described herein above. Whether recited as a system, method, of computer program product, it should be appreciated that the illustrative embodiments described herein are specifically directed to an improved computing tool and the methodology implemented by this improved computing tool as an improved computing tool operation with improved computer functionality. In particular, the improved computing tool of the illustrative embodiments specifically provides improved computer functionality for performing entity re-resolution based on streaming data and a distributed clustering functionality. The improved computing tool implements mechanism and functionality, such as the entity re-resolution system 120 of FIG. 1, which cannot be practically performed by human beings either outside of, or with the assistance of, a technical environment, such as a mental process or the like. The improved computing tool provides a practical application of the methodology at least in that the improved computing tool is able to dynamically and automatically perform entity re-resolution for entities in a knowledge graph data structure based on streaming data so as to maintain the knowledge graph up-to-date and thereby improve the accuracy of downstream computing systems that rely on the knowledge represented in the knowledge graph data structure.

FIG. 14 depicts a pictorial representation of an example distributed data processing system in which aspects of the illustrative embodiments may be implemented. Distributed data processing system 1400 may include a network of computers in which aspects of the illustrative embodiments may be implemented. The distributed data processing system 1400 contains at least one network 1402, which is the medium used to provide communication links between various devices and computers connected together within distributed data processing system 1400. The network 1402 may include connections, such as wire, wireless communication links, or fiber optic cables.

In the depicted example, server 1404, server 1406, and server 1414 are connected to network 1402 along with storage unit 1408. In addition, clients 1410-1412 are also connected to network 1402. These clients 1410-1412 may be, for example, personal computers, network computers, or the like. In the depicted example, server 1404 provides data, such as boot files, operating system images, and applications to the clients 1410-1412. Clients 1410-1412 are clients to server 1404 in the depicted example. Distributed data processing system 1400 may include additional servers, clients, and other devices not shown.

In the depicted example, distributed data processing system 1400 is the Internet with network 1402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 1400 may also be implemented to include a number of different types of networks, such as for example, an intranet, a local area network (LAN), a wide area network (WAN), or the like. As stated above, FIG. 14 is intended as an example, not as an architectural limitation for different embodiments of the present invention, and therefore, the particular elements shown in FIG. 14 should not be considered limiting with regard to the environments in which the illustrative embodiments of the present invention may be implemented.

As shown in FIG. 14, one or more of the computing devices, e.g., server 1404, may be specifically configured to implement an entity re-resolution system in accordance with one or more of the illustrative embodiments described above, such as the entity re-resolution system 120 in FIG. 1. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 1404, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automated and dynamic entity re-resolution with regard to knowledge graphs by providing mechanisms that perform distributed clustering operations and knowledge graph data structure updating to reflect a current state of streaming data referencing various entities or topics and providing a visualization output indicating reasoning for the updates to the knowledge graph and providing the knowledge graph to downstream computing systems for use in performing their artificial intelligence, decision support, or other operations that are reliant on knowledge graph data structures.

For example, as shown in FIG. 14, one or more server computing devices 1406 may provide an initial set of documents D having entity/topic labels, and a corresponding knowledge graph. The entity re-resolution system 120 may process these documents D through the pre-processing engine, cluster initialization engine, and the like, to generate an initial set of clusters and an initialized distributed clustering operation. One or more servers 1414 may provide streaming data having new documents D', such as portions of textual content from social networking websites, news feeds, instant messaging services, or the like, to the entity re-resolution system 120 which processes these new documents D' through the pre-processing engine and a cluster update engine to thereby cluster these new documents D' based on the previously existing clusters and generate a mapping of topics of the new documents to cluster labels. This clustering may be performed in a distributed manner when sequential execution is not required, such as when new clusters do not need to be generated, such that the server 1404 may distribute partitions of the new document D' dataset for processing by a plurality of other computing devices on the network 1402. The entity re-resolution system 120 may perform re-resolution of the updated clusters to perform merging/splitting of topics and generate a re-resolved clustering of the union of the initial documents D and new documents D'. The re-resolved clustering is then used to update the knowledge graph and provide a re-resolved knowledge graph to downstream computing systems that perform operations based on that knowledge graph, such as server 1412 and AI, decision support, or other functionality implemented by the specific mechanisms of the configured server 1412. In addition, the entity re-resolution system 120 may also generate a visualization output that is provided as a representation of the reasoning for the re-resolved knowledge graph, such as to a data steward or other authorized user, e.g., via client device 1410.

As noted above, the mechanisms of the illustrative embodiments utilize specifically configured computing devices, or data processing systems, to perform the operations for automatic and dynamic entity re-resolution based on streaming data. These computing devices, or data processing systems, may comprise various hardware elements which are specifically configured, either through hardware configuration, software configuration, or a combination of hardware and software configuration, to implement one or more of the systems/subsystems described herein. FIG. 15 is a block diagram of just one example data processing system in which aspects of the illustrative embodiments may be implemented. Data processing system 1500 is an example of a computer, such as server 1404 in FIG. 14, in which computer usable code or instructions implementing the processes and aspects of the illustrative embodiments of the present invention may be located and/or executed so as to achieve the operation, output, and external effects of the illustrative embodiments as described herein.

In the depicted example, data processing system 1500 employs a hub architecture including north bridge and memory controller hub (NB/MCH) 1502 and south bridge and input/output (I/O) controller hub (SB/ICH) 1504. Processing unit 1506, main memory 1508, and graphics processor 1510 are connected to NB/MCH 1502. Graphics processor 1510 may be connected to NB/MCH 1502 through an accelerated graphics port (AGP).

In the depicted example, local area network (LAN) adapter 1512 connects to SB/ICH 1504. Audio adapter 1516, keyboard and mouse adapter 1520, modem 1522, read only memory (ROM) 1524, hard disk drive (HDD) 1526, CD-ROM drive 1530, universal serial bus (USB) ports and other communication ports 1532, and PCI/PCIe devices 1534 connect to SB/ICH 1504 through bus 1538 and bus 1540. PCI/PCIe devices may include, for example, Ethernet adapters, add-in cards, and PC cards for notebook computers. PCI uses a card bus controller, while PCIe does not. ROM 1524 may be, for example, a flash basic input/output system (BIOS).

HDD 1526 and CD-ROM drive 1530 connect to SB/ICH 1504 through bus 1540. HDD 1526 and CD-ROM drive 1530 may use, for example, an integrated drive electronics (IDE) or serial advanced technology attachment (SATA) interface. Super I/O (SIO) device 1536 may be connected to SB/ICH 1504.

An operating system runs on processing unit 1506. The operating system coordinates and provides control of various components within the data processing system 1500 in FIG. 15. As a client, the operating system may be a commercially available operating system such as Microsoft® Windows 11®. An object-oriented programming system, such as the Java™ programming system, may run in conjunction with the operating system and provides calls to the operating system from Java™ programs or applications executing on data processing system 1500.

As a server, data processing system 1500 may be, for example, an IBM eServer™ System p® computer system, Power™ processor based computer system, or the like, running the Advanced Interactive Executive (AIX®) operating system or the LINUX® operating system. Data processing system 1500 may be a symmetric multiprocessor (SMP) system including a plurality of processors in processing unit 1506. Alternatively, a single processor system may be employed.

Instructions for the operating system, the object-oriented programming system, and applications or programs are located on storage devices, such as HDD 1526, and may be loaded into main memory 1508 for execution by processing unit 1506. The processes for illustrative embodiments of the present invention may be performed by processing unit 1506 using computer usable program code, which may be located in a memory such as, for example, main memory 1508, ROM 1524, or in one or more peripheral devices 1526 and 1530, for example.

A bus system, such as bus 1538 or bus 1540 as shown in FIG. 15, may be comprised of one or more buses. Of course, the bus system may be implemented using any type of communication fabric or architecture that provides for a transfer of data between different components or devices attached to the fabric or architecture. A communication unit, such as modem 1522 or network adapter 1512 of FIG. 15, may include one or more devices used to transmit and receive data. A memory may be, for example, main memory 1508, ROM 1524, or a cache such as found in NB/MCH 1502 in FIG. 15.

As mentioned above, in some illustrative embodiments the mechanisms of the illustrative embodiments may be implemented as application specific hardware, firmware, or the like, application software stored in a storage device, such as HDD 1526 and loaded into memory, such as main memory 1508, for being executed by one or more hardware processors, such as processing unit 1506, or the like. As such, the computing device shown in FIG. 15 becomes specifically configured to implement the mechanisms of the illustrative embodiments and specifically configured to perform the operations and generate the outputs described herein with regard to the entity re-resolution system.

Those of ordinary skill in the art will appreciate that the hardware in FIGS. 14 and 15 may vary depending on the implementation. Other internal hardware or peripheral devices, such as flash memory, equivalent non-volatile memory, or optical disk drives and the like, may be used in addition to or in place of the hardware depicted in FIGS. 14 and 15. Also, the processes of the illustrative embodiments may be applied to a multiprocessor data processing system, other than the SMP system mentioned previously, without departing from the spirit and scope of the present invention.

Moreover, the data processing system 1500 may take the form of any of a number of different data processing systems including client computing devices, server computing devices, a tablet computer, laptop computer, telephone or other communication device, a personal digital assistant (PDA), or the like. In some illustrative examples, data processing system 1500 may be a portable computing device that is configured with flash memory to provide non-volatile memory for storing operating system files and/or user-generated data, for example. Essentially, data processing system 1500 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, the method comprising the data processing system:
    receiving a knowledge graph data structure comprising data representations of a plurality of first entities specified in a first set of documents, and a corresponding set of initial clusters associated with corresponding ones of the plurality of first entities;
    receiving at least one dynamic data stream from at least one source computing system, the at least one dynamic data stream comprising second documents having data specifying second entities referenced by the second documents, wherein each second document is a collection of unstructured textual data; and
    automatically, in response to receiving the at least one dynamic data stream:
        executing a clustering operation on the second documents based on the set of initial clusters, and document features of the second documents, to provide a set of second document clusters comprising the second documents, wherein the clustering operation is a modified Dirichlet Hawkes Process (DHP) that performs distributed clustering, in parallel, on partitions of the at least one dynamic data stream, across a master compute node and a plurality of slave compute nodes of the data processing system;
        determining, for each second document cluster in the one or more second document clusters, whether the second document cluster should be modified based on entities associated with the second document cluster;
        executing, for each second document cluster that is determined should be modified, a cluster modification operation on the second document cluster, wherein updated clusters are generated comprising a combination of second document clusters that are modified and second document clusters that are not modified;
        dynamically executing entity re-resolution on the plurality of first entities in the knowledge graph data structure based on the second entities associated with the updated clusters to generate an updated knowledge graph data structure;
        inputting information associated with the updated knowledge graph data structure into an artificial intelligence computing system and analyzing patterns of the entity re-resolution; and
        generating an identity-fraud alert based on analyzing the patterns of the entity re-resolution and based on a determination that an entity is re-resolved a plurality of times over a time period.

2. The method of claim 1, further comprising:
    providing the updated knowledge graph data structure to a downstream computer system to perform a downstream computer system operation based on the updated knowledge graph data structure.

3. The method of claim 1, wherein the clustering operation performs clustering based on temporal characteristics associated with the second entities referenced in the second documents of the at least one dynamic data stream.

4. The method of claim 3, wherein the clustering operation comprises:
    performing distributed DHP clustering when no new clusters are needed as part of the clustering operation; and
    performing non-distributed DHP clustering when a new cluster is determined to be needed as part of the clustering operation.

5. The method of claim 1, wherein the cluster modification operation comprises merging entities that only occur in the same second document cluster so that a single entity represents the same second document cluster in the updated clusters.

6. The method of claim 1, wherein the cluster modification operation comprises:
    determining whether an entity is present in more than one second document cluster; and
    in response to the entity being present in more than one second document cluster:
        associating the entity with a first one of the second document clusters of the entity; and
        generating one or more sub-entities corresponding to the entity, wherein each of the one or more sub-entities is associated with a second one of second document clusters or a newly generated cluster.

7. The method of claim 6, wherein the one or more sub-entities corresponding to the entity are entities corresponding to a smallest sub-cluster of at least one of the more than one second document cluster.

8. The method of claim 1, wherein the at least one source computing system comprises at least one of a social media website, a social networking computer system, a news feed computer system, a document aggregator computer system, a document segregator computer system, or a data streaming services computer system, and wherein the streaming data comprises metadata and textual content corresponding to submissions from users of the at least one source computing system.

9. The method of claim 1, further comprising:
inputting the updated knowledge graph data structure into a graph neural network that generates embeddings of characteristics, for each node in the updated knowledge graph data structure, of a neighborhood of that node in the updated knowledge graph data structure; and
generating a visualization output that explains reasoning for entity re-resolution in the updated knowledge graph data structure at least by projecting the embeddings of the characteristics, wherein the visualization output represents proximity of re-resolved entities with regard to temporal characteristics.

10. The method of claim 1, wherein executing the clustering operation comprises:
determining, based on the set of initial clusters, for each second entity, whether the clustering operation requires creation of a new cluster for the second entity;
in response to determining that none of the second entities require creation of a new cluster, executing the clustering operation on partitions of the second documents distributed across a plurality of first compute nodes; and
in response to a determination that at least one second entity requires creation of a new cluster for the at least one second entity, generating the new cluster for the at least one second entity and executing the clustering operation in a sequential clustering operation by a second compute node.

11. A non-transitory computer-readable medium storing a set of instructions for distributed data processing, the set of instructions comprising:
one or more instructions that, when executed by one or more processors of a device, cause the device to:
receive a knowledge graph data structure comprising data representations of a plurality of first entities specified in a first set of documents, and a corresponding set of initial clusters associated with corresponding ones of the plurality of first entities;
receive at least one dynamic data stream from at least one source computing system, the at least one dynamic data stream comprising second documents having data specifying second entities referenced by the second documents, wherein each second document is a collection of unstructured textual data; and
automatically, in response to receiving the at least one dynamic data stream:
execute a clustering operation on the second documents based on the set of initial clusters, and document features of the second documents, to provide a set of second document clusters comprising the second documents, wherein the clustering operation is a modified Dirichlet Hawkes Process (DHP) that performs distributed clustering, in parallel, on partitions of the at least one dynamic data stream, across a master compute node and a plurality of slave compute nodes of the data processing system;
determine, for each second document cluster in the one or more second document clusters, whether the second document cluster should be modified based on entities associated with the second document cluster;
execute, for each second document cluster that is determined should be modified, a cluster modification operation on the second document cluster, wherein updated clusters are generated comprising a combination of second document clusters that are modified and second document clusters that are not modified;
dynamically execute entity re-resolution on the plurality of first entities in the knowledge graph data structure based on the second entities associated with the updated clusters to generate an updated knowledge graph data structure;
input information associated with the updated knowledge graph data structure into an artificial intelligence computing system and analyzing patterns of the entity re-resolution; and
generate an identity-fraud alert based on analyzing the patterns of the entity re-resolution and based on a determination that an entity is re-resolved a plurality of times over a time period.

12. The non-transitory computer-readable medium of claim 11, wherein the one or more instructions, cause the device to:
provide the updated knowledge graph data structure to a downstream computer system to perform a downstream computer system operation based on the updated knowledge graph data structure.

13. The non-transitory computer-readable medium of claim 11, wherein the clustering operation performs clustering based on temporal characteristics associated with the second entities referenced in the second documents of the at least one dynamic data stream.

14. The non-transitory computer-readable medium of claim 13, wherein the one or more instructions, to cause the device to perform the clustering operation, cause the device to:
perform a distributed DHP clustering when no new clusters are needed as part of the clustering operation; and
perform a non-distributed DHP clustering when a new cluster is determined to be needed as part of the clustering operation.

15. The non-transitory computer-readable medium of claim 11, wherein the one or more instructions, to cause the device to perform a cluster modification operation, cause the device to merge entities that only occur in a same second document cluster so that a single entity represents the same second document cluster in the updated clusters.

16. The non-transitory computer-readable medium of claim 11, wherein the one or more instructions, to cause the device to perform cluster modification operation, cause the device to:
determine whether an entity is present in more than one second document cluster; and
in response to the entity being present in more than one second document cluster:
associate the entity with a first one of the second document clusters of the entity; and
generate one or more sub-entities corresponding to the entity, wherein each of the one or more sub-entities is associated with a second one of second document clusters or a newly generated cluster.

17. The non-transitory computer-readable medium of claim 16, wherein the one or more sub-entities corresponding to the entity are entities corresponding to a smallest sub-cluster of at least one of the more than one second document cluster.

18. The non-transitory computer-readable medium of claim 11, wherein the one or more instructions cause the device to:
input the updated knowledge graph data structure into a graph neural network that generates embeddings of characteristics, for each node in the updated knowledge graph data structure, of a neighborhood of that node in the updated knowledge graph data structure; and generate a visualization output that explains reasoning for entity re-resolution in the updated knowledge graph data structure at least by projecting the embeddings of the characteristics, wherein the visualization output represents proximity of re-resolved entities with regard to temporal characteristics.

19. The non-transitory computer-readable medium of claim 11, wherein the one or more instructions, to cause the device to execute the clustering operation, cause the device to:

determine, based on the set of initial clusters, for each second entity, whether the clustering operation requires creation of a new cluster for the second entity;

in response to determining that none of the second entities require creation of a new cluster, execute the clustering operation on partitions of the second documents distributed across a plurality of first compute nodes; and in response to a determination that at least one second entity requires creation of a new cluster for the at least one second entity, generate the new cluster for the at least one second entity and execute the clustering operation in a sequential clustering operation by a second compute node.

20. A data processing system, comprising:

one or more processors; and one or more memory devices coupled to the one or more processors, wherein the one or more processors are configured to:

receive a knowledge graph data structure comprising data representations of a plurality of first entities specified in a first set of documents, and a corresponding set of initial clusters associated with corresponding ones of the plurality of first entities;

receive at least one dynamic data stream from at least one source computing system, the at least one dynamic data stream comprising second documents having data specifying second entities referenced by the second documents, wherein each second document is a collection of unstructured textual data; and automatically, in response to receiving the at least one dynamic data stream:

execute a clustering operation on the second documents based on the set of initial clusters, and document features of the second documents, to provide a set of second document clusters comprising the second documents, wherein the clustering operation is a modified Dirichlet Hawkes Process (DHP) that performs distributed clustering, in parallel, on partitions of the at least one dynamic data stream, across a master compute node and a plurality of slave compute nodes of the data processing system;

determine, for each second document cluster in the one or more second document clusters, whether the second document cluster should be modified based on entities associated with the second document cluster;

execute, for each second document cluster that is determined should be modified, a cluster modification operation on the second document cluster, wherein updated clusters are generated comprising a combination of second document clusters that are modified and second document clusters that are not modified;

dynamically execute entity re-resolution on the plurality of first entities in the knowledge graph data structure based on the second entities associated with the updated clusters to generate an updated knowledge graph data structure;

input information associated with the updated knowledge graph data structure into an artificial intelligence computing system and analyzing patterns of the entity re-resolution; and generate an identity-fraud alert based on analyzing the patterns of the entity re-resolution and based on a determination that an entity is re-resolved a plurality of times over a time period.

* * * * *